US010990240B1

(12) United States Patent
Ravasz et al.

(10) Patent No.: US 10,990,240 B1
(45) Date of Patent: Apr. 27, 2021

(54) ARTIFICIAL REALITY SYSTEM HAVING MOVABLE APPLICATION CONTENT ITEMS IN CONTAINERS

(71) Applicant: Facebook Technologies, LLC, Menlo Park, CA (US)

(72) Inventors: Jonathan Ravasz, London (GB); Jasper Stevens, London (GB); Adam Tibor Varga, London (GB); Etienne Pinchon, London (GB); Simon Charles Tickner, Canterbury (GB); Jennifer Lynn Spurlock, Seattle, WA (US); Kyle Eric Sorge-Toomey, Seattle, WA (US); Robert Ellis, London (GB); Barrett Fox, Berkeley, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/435,134

(22) Filed: Jun. 7, 2019

(51) Int. Cl.
*G06F 3/0481* (2013.01)
*G06F 3/01* (2006.01)
*G06T 19/00* (2011.01)
*G02B 27/01* (2006.01)

(52) U.S. Cl.
CPC ....... *G06F 3/04815* (2013.01); *G02B 27/017* (2013.01); *G06F 3/017* (2013.01); *G06T 19/006* (2013.01)

(58) Field of Classification Search
CPC .................................................. G06T 19/006
See application file for complete search history.

(56) References Cited

U.S. PATENT DOCUMENTS

| 10,551,993 | B1* | 2/2020 | Sanocki | G06F 3/017 |
| 2009/0100368 | A1* | 4/2009 | Look | G06F 3/1454 715/775 |
| 2011/0078625 | A1* | 3/2011 | Mumford | G06F 9/451 715/804 |
| 2015/0089419 | A1* | 3/2015 | Hwang | G06F 3/04883 715/768 |
| 2018/0144556 | A1* | 5/2018 | Champion | G06F 3/04842 |
| 2019/0004618 | A1* | 1/2019 | Tadros | G06T 7/30 |
| 2019/0094981 | A1* | 3/2019 | Bradski | G02B 27/0093 |
| 2019/0251961 | A1* | 8/2019 | Wang | G10L 15/22 |
| 2019/0272141 | A1* | 9/2019 | Poel | H04N 7/15 |
| 2020/0051337 | A1* | 2/2020 | Reynolds | G06F 3/011 |

* cited by examiner

*Primary Examiner* — Phi Hoang
(74) *Attorney, Agent, or Firm* — Shumaker & Sieffert, P.A.

(57) ABSTRACT

An artificial reality system is described that renders, presents, and controls user interface elements within an artificial reality environment, and performs actions in response to one or more detected gestures of the user. The artificial reality system captures image data representative of a physical environment and outputs artificial reality content. The artificial reality system renders a container that includes application content items as an overlay to the artificial reality content. The artificial reality system identifies, from the image data, a selection gesture comprising a configuration of a hand that is substantially stationary for a threshold period of time at a first location corresponding to a first application content item within the container, and a subsequent movement of the hand from the first location to a second location outside the container. The artificial reality system renders the first application content item at the second location in response.

20 Claims, 18 Drawing Sheets

ARTIFICIAL REALITY SYSTEM HAVING MOVABLE APPLICATION CONTENT ITEMS IN CONTAINERS

TECHNICAL FIELD

This disclosure generally relates to artificial reality systems, such as virtual reality, mixed reality and/or augmented reality systems, and more particularly, to user interfaces of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch applications or otherwise configure the system.

SUMMARY

In general, this disclosure describes artificial reality systems and, more specifically, graphical user interface elements and techniques for presenting and controlling the user interface elements within an artificial reality environment.

For example, artificial reality systems are described that generate and render graphical user interface elements for display to a user in response to detection of one or more pre-defined gestures by the user, such as particular motions, configurations, positions, and/or orientations of the user's hands, fingers, thumbs or arms, or a combination of pre-defined gestures. In some examples, the artificial reality system may further trigger generation and rendering of the graphical user interface elements in response to detection of particular gestures in combination with other conditions, such as the position and orientation of the particular gestures in a physical environment relative to a current field of view of the user, which may be determined by real-time gaze tracking of the user, or relative to a pose of an HMD worn by the user.

In some examples, the artificial reality system may generate and present the graphical user interface elements as overlay elements with respect to the artificial reality content currently being rendered within the display of the artificial reality system. The graphical user interface elements may, for example, be a graphical user interface, such as a menu or sub-menu with which the user interacts to operate the artificial reality system, or individual graphical user interface elements selectable and manipulatable by a user, such as toggle elements, drop-down elements, menu selection elements, two-dimensional or three-dimensional shapes, graphical input keys or keyboards, content display windows and the like.

When presenting the graphical user interface elements in the artificial reality content, placing the graphical user interface elements within some graphical container can provide distinct separation between the graphical user interface elements that are interactive and the background environment of the artificial reality content. However, statically placing these elements in the container and forcing interaction within and only within that container may limit the overall functionality of the artificial reality system and reduce the flexibility that users desire from artificial reality systems.

In accordance with the techniques described herein, an artificial reality system may render one or more application content items within a container in the artificial reality content. The artificial reality system may detect, from image data representative of the physical environment, a selection gesture comprising a configuration of a hand that is substantially stationary for at least a threshold period of time at a first location corresponding to a first application content item within the container and positioned to select the first application content item, and a subsequent movement of the hand from the first location to a second location outside the container. The artificial reality system may further identify the selection gesture as the hand positioned in a particular way to select the first application content item, such as a pinching configuration or a grabbing or gripping configuration. The artificial reality system may render a drag-and-drop depiction for the first application content item, rendering the first application content item along the path of the subsequent movement outside of the container and becoming stationary at a point where the subsequent movement completes, such as when the subsequent movement stops and/or when the pinching or grabbing configuration is released. The artificial reality system may later detect another selection gesture and subsequent movement to relocate the first application content item back into the original container or into a new container within the artificial reality content.

In many artificial reality systems, users may be required to hold additional pieces of hardware in their hands in order to provide user input to the artificial reality system, which may decrease the accessibility for users with various disabilities and provide an awkward or unnatural interface for the user. In artificial reality systems in which users do not hold additional hardware pieces, it may be difficult to accurately detect user input in an intuitive and reliable manner. Further, the artificial reality systems that do not require the additional hardware pieces may be unable to provide useful feedback to the user as to when and how particular user interface elements are selected to the artificial reality system. By utilizing the techniques described herein, the artificial reality system may provide a natural input system that uses self-haptic feedback, or the feeling of the user's own digits coming into contact when making the selection gesture. Furthermore, as it may be more difficult to replicate all of the functionality of a device with multiple hardware inputs, the techniques described herein may provide drag-and-drop functionality to artificial reality systems, as well as cut/copy-and-paste functionality. For instance, when the two containers in the artificial reality content are different file folders, dragging an application content item from one container to the other container may move (i.e., cut) or replicate (i.e., copy) the application content item from the original container to the new container. In other instances, when one container is a private container visible to only to the user and a second container is a public container visible to one or more other artificial reality system users, the techniques described herein may provide a simple way for the user to control what application content items are shared with other users and what application content items are kept visible to only the user. The techniques described herein may reduce or even eliminate the need for users to hold additional hardware pieces in order to provide user input, thereby increasing the overall efficiency of the system, reducing processing of communications between separate components of the artificial reality system, and increasing accessibility of artificial reality systems for users of all levels of physical ability.

In one example of the techniques described herein, an artificial reality system includes an image capture device configured to capture image data representative of a physical environment. The artificial reality system also includes an HMD configured to output artificial reality content. The artificial reality system further includes a rendering engine configured to render a container that includes one or more application content items as an overlay to the artificial reality content. The artificial reality system also includes a gesture detector configured to identify, from the image data, a selection gesture. The selection gesture is a configuration of a hand that is substantially stationary for at least a threshold period of time at a first location corresponding to a first application content item within the container and positioned to select the first application content item, and a subsequent movement of the hand from the first location to a second location outside the container. The rendering engine of the artificial reality system is further configured to render the first application content item at the second location in response to the selection gesture and the subsequent movement.

In another example of the techniques described herein, a method includes capturing, by an HMD of an artificial reality system, image data representative of a physical environment. The method further includes outputting, by the HMD, artificial reality content. The method also includes rendering a container that includes one or more application content items as an overlay to the artificial reality content. The method further includes identifying, from the image data, a selection gesture. The selection gesture is a configuration of a hand that is substantially stationary for at least a threshold period of time at a first location corresponding to a first application content item within the container and positioned to select the first application content item, and a subsequent movement of the hand from the first location to a second location outside the container. The method also includes rendering the first application content item at the second location in response to the selection gesture and the subsequent movement.

In another example of the techniques described herein, a non-transitory computer-readable medium includes instructions that, when executed, cause one or more processors of an artificial reality system to capture image data representative of a physical environment. The instructions, when executed, further cause the one or more processors to output artificial reality content. The instructions, when executed, also cause the one or more processors to render a container that includes one or more application content items as an overlay to the artificial reality content. The instructions, when executed, further cause the one or more processors to identify, from the image data, a selection gesture. The selection gesture is a configuration of a hand that is substantially stationary for at least a threshold period of time at a first location corresponding to a first application content item within the container and positioned to select the first application content item, and a subsequent movement of the hand from the first location to a second location outside the container. The instructions, when executed, also cause the one or more processors to render the first application content item at the second location in response to the selection gesture and the subsequent movement.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
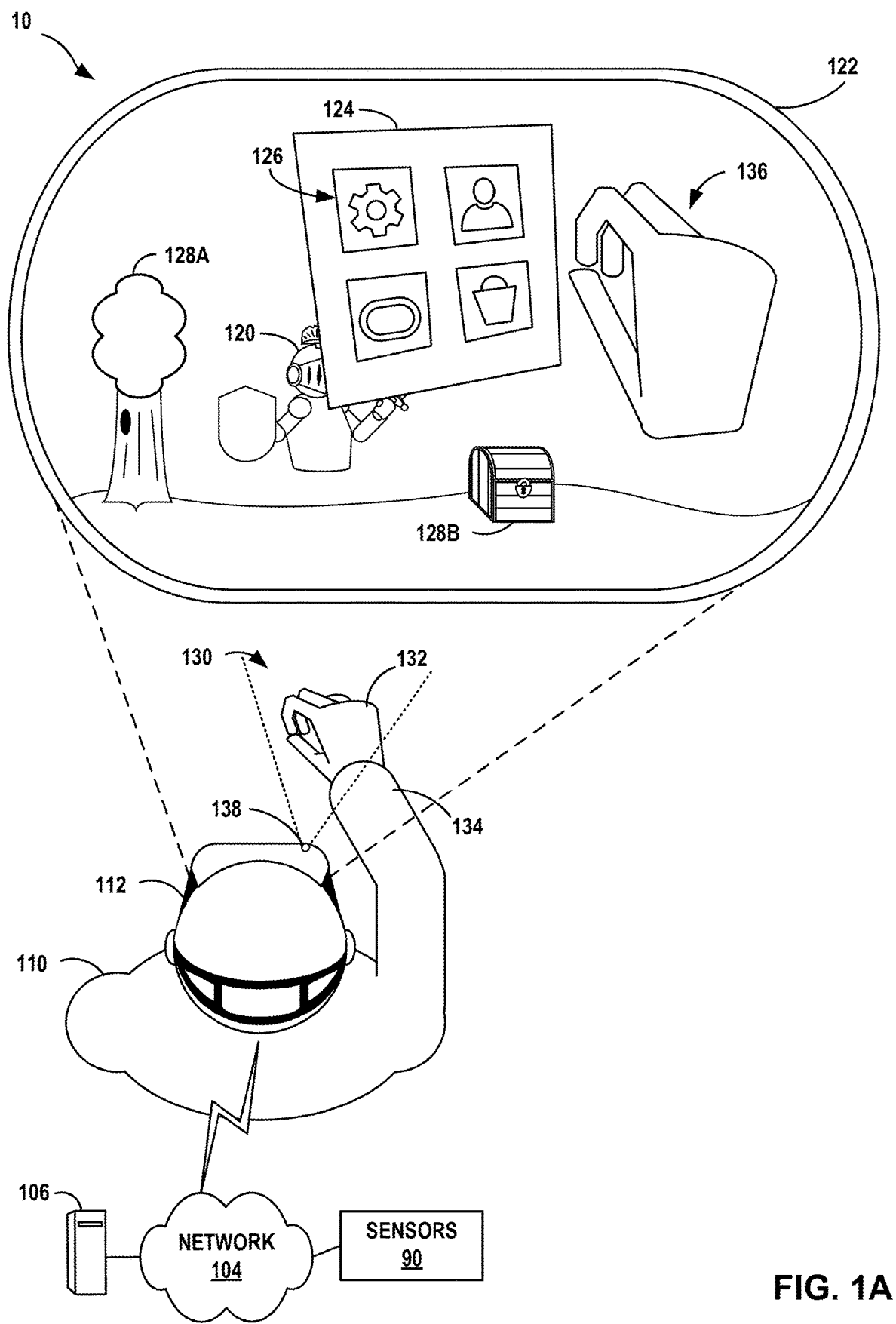
FIG. 1A is an illustration depicting an example artificial reality system that presents and controls user interface elements within an artificial reality environment in accordance with the techniques of the disclosure.

FIG. 1A is an illustration depicting an example artificial reality system 10 that presents and controls user interface elements within an artificial reality environment in accordance with the techniques of the disclosure. In some example implementations, artificial reality system 10 generates and renders graphical user interface elements to a user 110 in response to one or more detected gestures performed by user 110. That is, as described herein, artificial reality system 10 presents one or more graphical user interface elements 124, 126 in response to detecting one or more particular gestures performed by user 110, such as particular motions, configurations, locations, and/or orientations of the user's hands, fingers, thumbs or arms. In other examples, artificial reality system 10 presents and controls user interface elements specifically designed for user interaction and manipulation within an artificial reality environment, such as specialized toggle elements, drop-down elements, menu selection elements, graphical input keys or keyboards, content display windows and the like.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Moreover, in accordance with the techniques of this disclosure, based on the sensed data, the artificial reality application detects gestures performed by user 110 and, in response to detecting one or more particular gestures, generates one or more user interface elements, e.g., UI menu 124 and UI element 126, which may be overlaid on underlying artificial reality content 122 being presented to the user. In this respect, user interface elements 124, 126 may be viewed as part of the artificial reality content 122 being presented to the user in the artificial reality environment. In this way, artificial reality system 10 dynamically presents one or more graphical user interface elements 124, 126 in response to detecting one or more particular gestures by user 110, such as particular motions, configurations, positions, and/or orientations of the user's hands, fingers, thumbs or arms. Example configurations of a user's hand may include a fist, one or more digits extended, the relative and/or absolute positions and orientations of one or more of the individual digits of the hand, the shape of the palm of the hand, and so forth. The user interface elements may, for example, be a graphical user interface, such as a menu or sub-menu with which user 110 interacts to operate the artificial reality system, or individual user interface elements selectable and manipulatable by user 110, such as toggle elements, drop-down elements, menu selection elements, two-dimensional or three-dimensional shapes, graphical input keys or keyboards, content display windows and the like. While depicted as a two-dimensional element, for example, UI element 126 may be a two-dimensional or three-dimensional shape that is manipulatable by a user performing gestures to translate, scale, and/or rotate the shape in the artificial reality environment.

While referred to herein as a UI menu, user interface element 124 may instead include any other type of graphical content output in artificial reality content 122. For instance, user interface element 124 may instead include one or more of a thumbnail grid, a website, a list, graphical elements of an application, application or device settings, or any other graphical content that may be output in artificial reality content 122.

Moreover, as described herein, in some examples, artificial reality system 10 may trigger generation and rendering of graphical user interface elements 124, 126 in response to other conditions, such as a current state of one or more applications being executed by the system, or the position and orientation of the particular detected gestures in a physical environment in relation to a current field of view 130 of user 110, as may be determined by real-time gaze tracking of the user, or other conditions.

More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. In some examples, such as the illustrated example of FIG. 1A, the artificial reality application renders the portions of hand 132 of user 110 that are within field of view 130 as a virtual hand 136 within artificial reality content 122. In other examples, the artificial reality application may present a real-world image of hand 132 and/or arm 134 of user 110 within artificial reality content 122 comprising mixed reality and/or augmented reality. In either example, user 110 is able to view the portions of their hand 132 and/or arm 134 that are within field of view 130 as objects within artificial reality content 122. In other examples, the artificial reality application may not render hand 132 or arm 134 of the user at all.

In any case, during operation, artificial reality system 10 performs object recognition within image data captured by image capture devices 138 of HMD 112 to identify hand 132, including optionally identifying individual fingers or the thumb, and/or all or portions of arm 134 of user 110. Further, artificial reality system 10 tracks the position, orientation, and configuration of hand 132 (optionally including particular digits of the hand) and/or portions of arm 134 over a sliding window of time. The artificial reality application analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be each mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112. The position and orientation of hand 132 (or a portion thereof) thereof may alternatively be referred to as the pose of hand 132 (or a portion thereof).

Moreover, the artificial reality application may analyze configurations, positions, and/or orientations of hand 132 and/or arm 134 to identify a gesture that includes hand 132 and/or arm 134 being held in one or more specific configuration, positions, and/or orientations for at least a threshold period of time. As examples, one or more particular positions at which hand 132 and/or arm 134 are being held substantially stationary within field of view 130 for at least a configurable period of time may be used by artificial reality system 10 as an indication that user 110 is attempting to perform a gesture intended to trigger a desired response by the artificial reality application, such as triggering display of a particular type of user interface element 124, 126, such as a menu. As another example, one or more particular configurations of the fingers and/or palms of hand 132 and/or arm 134 being maintained within field of view 130 for at least a configurable period of time may be used by artificial reality system 10 as an indication that user 110 is attempting to perform a gesture. Although only right hand 132 and right arm 134 of user 110 are illustrated in FIG. 1A, in other examples, artificial reality system 10 may identify a left hand and/or arm of user 110 or both right and left hands and/or arms of user 110. In this way, artificial reality system 10 may detect single-handed gestures performed by either hand, double-handed gestures, or arm-based gestures within the physical environment, and generate associated user interface elements in response to the detected gestures.

In accordance with the techniques of this disclosure, the artificial reality application determines whether an identified gesture corresponds to a gesture defined by one of a plurality of entries in a gesture library of console 106 and/or HMD 112. As described in more detail below, each of the entries in the gesture library may define a different gesture as a specific motion, configuration, position, and/or orientation of a user's hand, digit (finger or thumb) and/or arm over time, or a combination of such properties. In addition, each of the defined gestures may be associated with a desired response in the form of one or more actions to be performed by the artificial reality application. As one example, one or more of the defined gestures in the gesture library may trigger the generation, transformation, and/or configuration of one or more user interface elements, e.g., UI menu 124, to be rendered and overlaid on artificial reality content 122, where the gesture may define a location and/or orientation of UI menu 124 in artificial reality content 122. As another example, one or more of the defined gestures may indicate an interaction by user 110 with a particular user interface element, e.g., selection of UI element 126 of UI menu 124, to trigger a change to the presented user interface, presentation of a sub-menu of the presented user interface, or the like.

In accordance with the techniques described herein, artificial reality system 10 may detect gestures performed by hand 132 of user 110 and, based on the detected gestures, shift graphical user interface elements 126 within UI menu 124, to a location outside of UI menu 124, or to another container within artificial reality content 122. For the purposes of this disclosure, a container may be defined as any two- or three-dimensional graphical element that surrounds other, interactable graphical user interface elements. This may include a menu with different menu options, an application window with different elements inside the window, a document with text, pictures, or other media inside the document, or any other boundary for a group of one or more interactive elements. For instance, in the example of FIG. 1A, UI menu 124 may be a container that is said to include graphical user interface elements 126.

For instance, image capture devices 138, or external cameras, may be configured to capture image data representative of a physical environment. HMD 112 may be configured to output artificial reality content 122. Additionally, a rendering engine, executing on either HMD 112 or console 106, may be configured to render a first container (e.g., UI menu 124) that includes one or more application content items (e.g., graphical user interface items 126) as an overlay to artificial reality content 122. A gesture detector, executing on either HMD 112 or console 106, may be configured to identify, from the image data, a selection gesture, where the selection gesture is a configuration of hand 132 that is substantially stationary for at least a threshold period of time at a first location corresponding to a first application content item of graphical user interface elements 126 within UI menu 124 and positioned to select the first application content item of graphical user interface elements 126.

The selection position of the hand when making this selection gesture may include the hand being in a grabbing position. This grabbing position could be, in some instances, a two-finger pinch of the thumb and a second digit of the hand with a point of contact between the two fingers being the first location. In other instances, the grabbing position may be a single-hand formation of a fist at the first location, or a two-handed clasping of the hands at the first location. Other examples of the grabbing position include a one- or two-handed shaping around a boundary of the first application content item such that HMD 112 or console 106 detects the user's fingers or hands within a threshold proximity of two or more edges of the boundary of the first application content item, or any other configuration one would naturally make when grabbing an object.

HMD 112 or console 106 may also identify a subsequent movement of hand 132 from the first location to a second location outside of UI menu 124. In response to the gesture detector identifying the selection gesture and the subsequent movement, the rendering engine may be configured to render the first application content item of graphical user interface elements 126 at the second location.

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering user interface elements overlaid on the artificial reality content based on detection of intuitive, yet distinctive, gestures performed by the user.

Further, systems as described herein may be configured to detect certain gestures based on hand and arm movements that are defined to avoid tracking occlusion. Tracking occlusion may occur when one hand of the user at least partially overlaps the other hand, making it difficult to accurately track the individual digits (fingers and thumb) on each hand, as well as the position and orientation of each hand. Systems as described herein, therefore, may be configured to primarily detect single-handed or single arm-based gestures. The use of single-handed or single arm-based gestures may further provide enhanced accessibility to users having large- and fine-motor skill limitations. Furthermore, systems as described herein may be configured to detect double-handed or double arm-based gestures in which the hands of the user do not interact or overlap with each other.

In addition, systems as described herein may be configured to detect gestures that provide self-haptic feedback to the user. For example, a thumb and one or more fingers on each hand of the user may touch or approximately touch in the physical world as part of a pre-defined gesture indicating an interaction with a particular user interface element in the artificial reality content. The touch between the thumb and one or more fingers of the user's hand may provide the user with a simulation of the sensation felt by the user when interacting directly with a physical user input object, such as a button on a physical keyboard or other physical input device.

By utilizing the techniques described herein, artificial reality system 10 may provide a natural input system that uses self-haptic feedback, or the feeling of the user's own digits coming into contact when making the selection gesture. Furthermore, as it may be more difficult to replicate all of the functionality of a user input device with multiple hardware inputs, the techniques described herein may provide drag-and-drop functionality to artificial reality system 10, as well as cut/copy-and-paste functionality. For instance, when two containers are different file folders, dragging an application content item from one container to the other may move (i.e., cut) or replicate (i.e., copy) the application content item to the new container. In other instances, when one container is a private container visible only to the user and a second container is a public container visible to one or more other artificial reality system users, the techniques described herein may provide a simple way for the user to control what application content items are shared with other users and what application content items are kept visible to only the user. The techniques described herein may reduce or even eliminate the need for users to hold additional hardware pieces in order to provide user input, thereby increasing the overall efficiency of the system, reducing processing of communications between separate components of the artificial reality system, and increasing accessibility of artificial reality systems for users of all levels of physical ability.

Figure 1B:
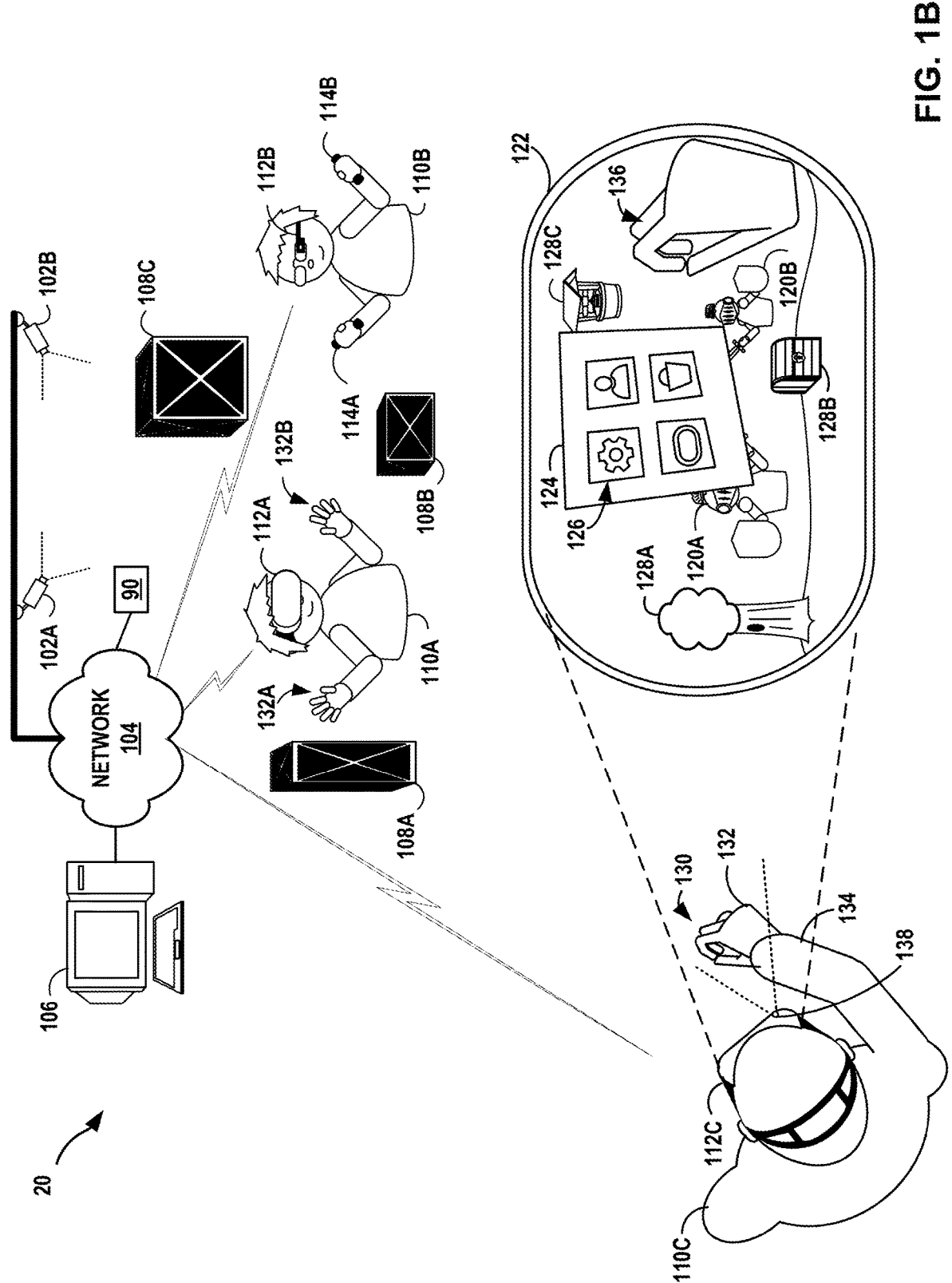
FIG. 1B is an illustration depicting another example artificial reality system in accordance with the techniques of the disclosure.

FIG. 1B is an illustration depicting another example artificial reality system 20 in accordance with the techniques of the disclosure. Similar to artificial reality system 10 of FIG. 1A, in some examples, artificial reality system 20 of FIG. 1B may present and control user interface elements specifically designed for user interaction and manipulation within an artificial reality environment. Artificial reality system 20 may also, in various examples, generate and render certain graphical user interface elements to a user in response detection of to one or more particular gestures of the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1, each of users 110 may be a "player" or "participant" in the artificial reality application, and any of users 110 may be a "spectator" or "observer" in the artificial reality application. HMD 112C may each operate substantially similar to HMD 112 of FIG. 1A by tracking hand 132 and/or arm 124 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110. Controllers 114 may be in communication with HMD 112B using near-field communication of short-range wireless communication such as Bluetooth, using wired communication links, or using another type of communication links.

In a manner similar to the examples discussed above with respect to FIG. 1A, console 106 and/or HMD 112C of artificial reality system 20 generates and renders user interface elements 124, 126, which may be overlaid upon the artificial reality content 122 displayed to user 110C. Moreover, console 106 and/or HMD 112C may trigger the generation and dynamic display of the user interface elements 124, 126 based on detection, via pose tracking, of intuitive, yet distinctive, gestures performed by user 110C. For example, artificial reality system 20 may dynamically present one or more graphical user interface elements 124, 126 in response to detecting one or more particular gestures by user 110C, such as particular motions, configurations, positions, and/or orientations of the user's hands, fingers, thumbs or arms. As shown in FIG. 1B, in addition to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand.

In accordance with the techniques described herein, artificial reality system 20 may detect gestures of hand 132 of user 110 and, based on the detected gestures, shift graphical user interface elements 126 within UI menu 124, to a location outside of UI menu 124, or to another container within artificial reality content 122. For instance, image capture devices 138 or cameras 102 may be configured to capture image data representative of a physical environment. HMD 112 may be configured to output artificial reality content 122. Additionally, a rendering engine, executing on either HMD 112 or console 106, may be configured to render a first container (e.g., UI menu 124) that includes one or more application content items (e.g., graphical user interface items 126) as an overlay to artificial reality content 122. A gesture detector, executing on either HMD 112 or console 106, may be configured to identify, from the image data, a selection gesture, where the selection gesture is a configuration of hand 132 that is substantially stationary for at least a threshold period of time at a first location corresponding to a first application content item of graphical user interface elements 126 within UI menu 124 and positioned to select the first application content item of graphical user interface elements 126, and a subsequent movement of hand 132 from the first location to a second location outside of UI menu 124. In response to the gesture detector identifying the selection gesture and the subsequent movement, the rendering engine may be configured to render the first application content item of graphical user interface elements 126 at the second location.

In some examples, the second location may be within a second container within artificial reality content 122. UI menu 124 may be a private container rendered only for HMD 112C. As such, graphical user interface elements 126 may also only be rendered for HMD 112C, visible only to user 110C. However, there may be graphical user interface elements that user 112C wishes to share with one or more other users, such as users 110A and/or 110B. There may be a second container (not shown) rendered as an overlay to in artificial reality content 122 that is visible to each of users 110, or a shared container between user 110C and one of users 110A or 110B. When the gesture detector of HMD 112C or console 106 identifies the selection gesture of hand 132 and a subsequent movement of one of graphical user interface elements 126 from UI menu 124 to the second, public container (or, if the graphical user interface element has already been placed in the virtual environment and not within any specific container, from that location to the second, public container), the moved graphical user interface element may be rendered for each of HMDs 112 with access to the public container. In this way, user 110C may share content, such as files or media streams, with one or more of users 110A and 110B. When sharing media streams, each of HMDs 112 may output the media stream, when executed, so that each of users 110 may experience the content together, even if the HMDs are in geographically different locations.

Figure 2:
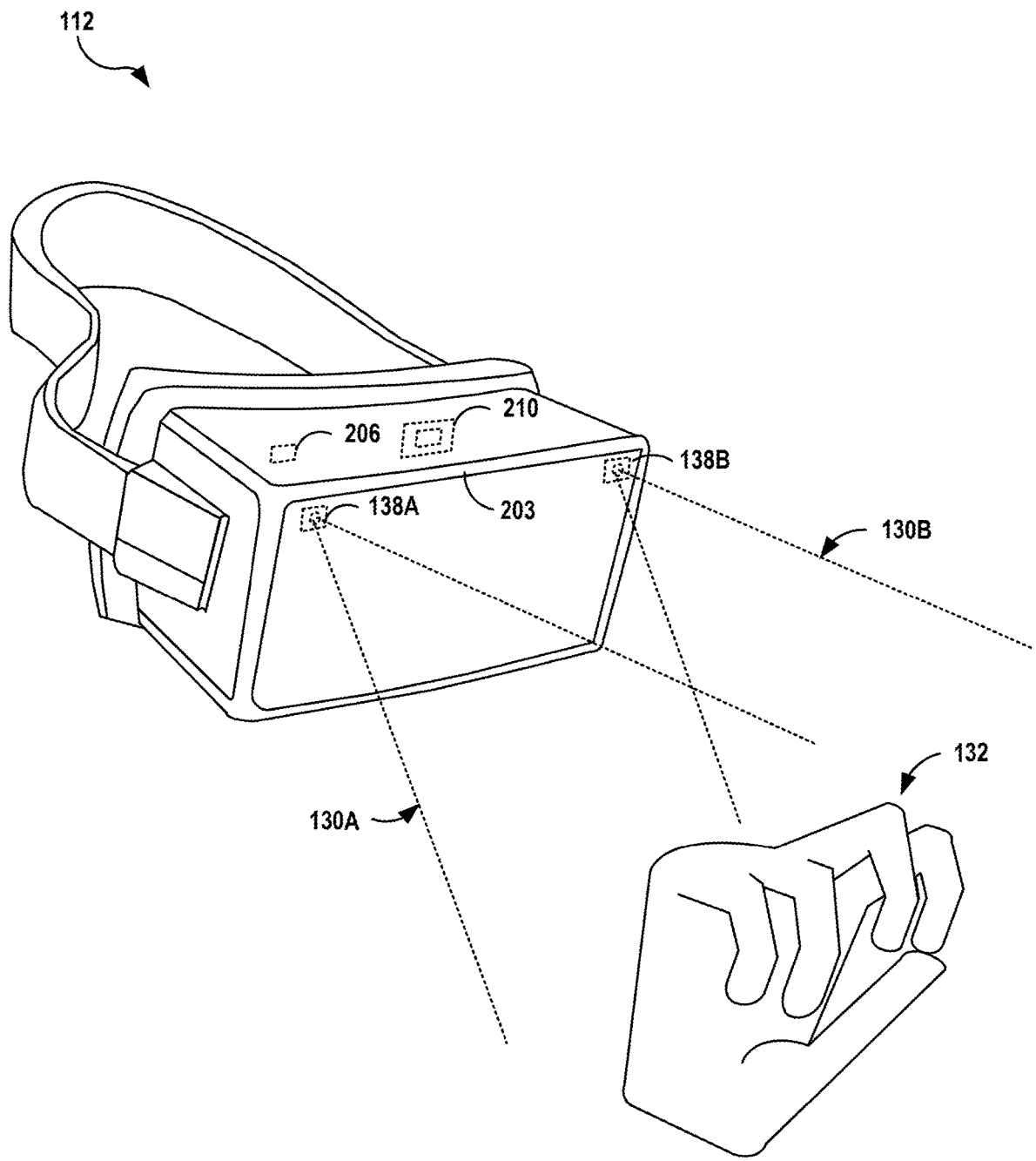
FIG. 2 is an illustration depicting an example HMD that operates in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of MID 112 and the user. In other examples, HMD may take the form of other wearable head mounted displays, such as glasses.

As further shown in FIG. 2, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of MID 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data, identify a specific gesture or combination of gestures performed by the user and, in response, perform an action. For example, in response to one identified gesture, control unit 210 may generate and render a specific user interface element overlaid on artificial reality content for display on electronic display 203. As explained herein, in accordance with the techniques of the disclosure, control unit 210 may perform object recognition within image data captured by image capture devices 138 to identify a hand 132, fingers, thumb, arm or another part of the user, and track movements of the identified part to identify pre-defined gestures performed by the user. In response to identifying a pre-defined gesture, control unit 210 takes some action, such as selecting an option from an option set associated with a user interface element, translating the gesture into input (e.g., characters), launching an application or otherwise displaying content, and the like. In some examples, control unit 210 dynamically generates and presents a user interface element, such as a menu, in response to detecting a pre-defined gesture specified as a "trigger" for revealing a user interface. In other examples, control unit 210 performs such functions in response to direction from an external device, such as console 106, which may perform, object recognition, motion tracking and gesture detection, or any part thereof.

In accordance with the techniques described herein, HMD 112 may detect gestures of hand 132 and, based on the detected gestures, shift application content items to another location within a container within the artificial reality content, to a location outside of the container, or to another container within the artificial reality content. For instance, image capture devices 138 may be configured to capture image data representative of a physical environment. Control unit 210 may output artificial reality content on electronic display 203. Control unit 210 may render a first container that includes one or more application content items as an overlay to the artificial reality content. Control unit 210 may identify, from the image data, a selection gesture, where the selection gesture is a configuration of hand 132 that is substantially stationary for at least a threshold period of time at a first location corresponding to a first application content item of the one or more application content items within the first container and positioned to select the first application content item, and a subsequent movement of hand 132 from the first location to a second location outside of the first container. In response to control unit 210 identifying the selection gesture and the subsequent movement, control unit 210 may render the first application content item at the second location within the artificial reality environment.

Figure 3:
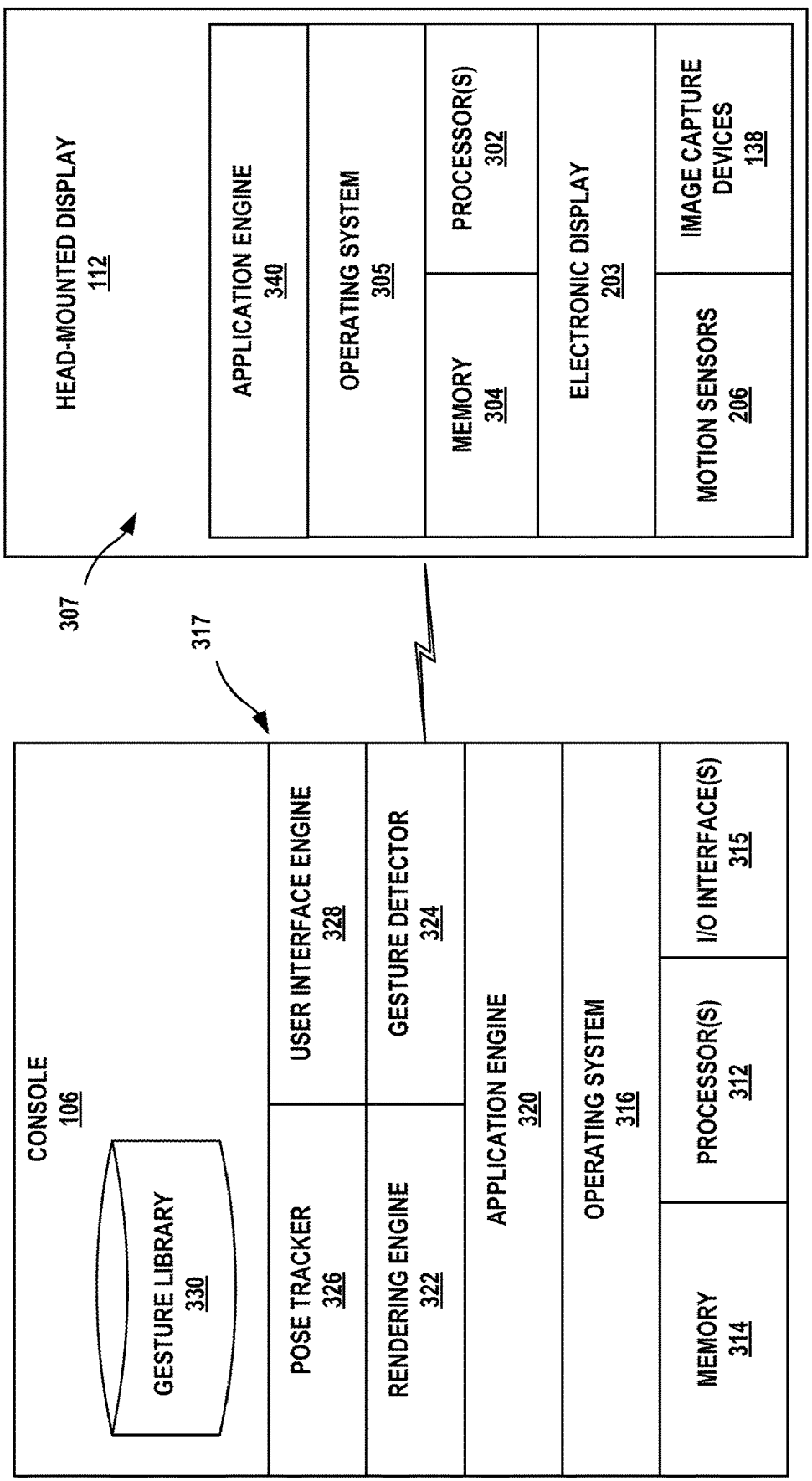
FIG. 3 is a block diagram showing example implementations of a console and an HMD of the artificial reality systems of FIGS. 1A, 1B.

FIG. 3 is a block diagram showing example implementations of console 106 and head mounted display 112 of artificial reality system 10, 20 of FIGS. 1A, 1B. In the example of FIG. 3, console 106 performs pose tracking, gesture detection, and user interface generation and rendering for HMD 112 in accordance with the techniques described herein based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the example of FIG. 2, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Moreover, based on the sensed data, gesture detector 324 analyzes the tracked motions, configurations, positions, and/or orientations of objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of the hand, digits, and/or arm based on the captured image data, and compare motion vectors of the objects to one or more entries in gesture library 330 to detect a gesture or combination of gestures performed by user 110. Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting objects, launching applications, and the like.

In accordance with the techniques described herein, gesture detector 324 may detect gestures performed by a hand of a user and, based on the detected gestures, rendering engine 322 may shift application content items to another location within a container rendered as an overly to the artificial reality content, to a location outside of the container, or to another container within the artificial reality content. For instance, image capture devices 138 may be configured to capture image data representative of a physical environment. HMD 112 may output artificial reality content on electronic display 203. Rendering engine 322 may render a first container that includes one or more application content items as an overlay to the artificial reality content. In some instances, each of the one or more application content items are each associated with a same application. For instance, the first container may be associated with a media streaming application, and each of the one or more application content items may be different media streaming files which can be consumed via MID 112 and console 106.

In other instances, the one or more application content items may be associated with different applications. In other words, the first application content item of the one or more application content items may be associated with a first application and a second application item of the one or more application content items may be associated with a second application different than the first application. As an example, the first container may be a file folder, and each of the application content items may be files, such as text documents, media items, slideshow presentations, spreadsheet documents, database documents, or any other document that may be read by a computing device. Each of the application content items may be executable by different applications, but they may all be contained within the first container.

Gesture detector 324 may identify, from the image data, a selection gesture, where the selection gesture comprises a configuration of a hand that is substantially stationary for at least a threshold period of time at a first location corresponding to a first application content item of the one or more application content items within the first container and positioned to select the first application content item. Upon detecting the selection gestures, gesture detector 324 may also detect a subsequent movement of the hand from the first location to a second location outside of the first container. In some instances, the selection gesture may include a particular configuration of the hand predefined to represent selection of the first application content item, the configuration being the hand being positioned to grab the first application content item within the first container. This grabbing position could be, in some instances, a two-finger pinch of the thumb and a second digit of the hand with a point of contact between the two fingers being the first location. In other instances, the grabbing position may be a single-hand formation of a fist at the first location, or a two-handed clasping of the hands at the first location. Other examples of the grabbing position include a one- or two-handed shaping around a boundary of the first application content item such that gesture detector 324 detects the user's fingers or hands within a threshold proximity of two or more edges of the boundary of the first application content item, or any other configuration one would naturally make when grabbing an object. When gesture detector 324 detects a release of the grabbing position after the subsequent movement, gesture detector 324 may recognize that the movement is completed at the location of the release of the grabbing position, signaling rendering engine 322 to render the first application content item at the location of the release of the grabbing position. Gesture library 330 may include an entry defining the selection gesture, and gesture detector 324 may compare the image data to the entry in gesture library 330 to determine when a selection gesture has been performed.

In response to gesture detector 324 identifying the selection gesture and the subsequent movement, rendering engine 322 may render the first application content item at the second location. When rendering engine 322 renders the first application content item at the second location, in some instances, rendering engine 322 may further cease rendering the first application content item within the first container in response to the selection gesture and the subsequent movement. In other instances, rendering engine 322 may continue rendering the first application content item within the first container in addition to rendering the first application content item at the second location (e.g., when HMD 112 is copying the application content item to another location). In some instances, the second location may be simply within the artificial reality environment, outside of the construct of any particular container. In other instances, rendering engine 322 may render the first application content item within a second container at the second location in response to the identified selection gesture and subsequent movement.

For instance, the first container may be a private container output only on electronic display 203 and only visible to the user of HMD 112. Meanwhile, the second container may be a public container, visible to the user of HMD 112, while also displayed on other MID devices in communication with console 106, either locally or over a network. In this way, MID 112 and console 106 may easily share files or media streams with other HMDs or other consoles. For instance, consoles in separate geographical locations from console 106 may connect to console 106 over a network to render similar artificial reality content to both HMDs. By using the techniques described herein to move the application content item into a public container, both HMDs may watch a same media stream at the same time and in the same environment, simulating the users of the geographically separate HMDs being local with one another. Once this content is output on other HMDs or consoles, those HMDs or consoles may recognize similar selection gestures to copy the first application content item into a local folder for later access.

Gesture detector 322 identify an execution gesture that includes a configuration of the hand positioned to execute the first application item at the second location. Application engine 320 may then execute an application function associated with the first application content item in response to the execution gesture. Gesture library 330 may include an entry defining the execution gesture, and gesture detector 324 may compare the image data to the entry in gesture library 330 to determine when an execution gesture has been performed. For instance, when the first application content item is a media streaming item, the execution gesture may trigger application engine 320 to begin streaming the media streaming item. The execution gesture may be distinct from the selection gesture, such as a poke of the item using one or more digits of a hand or a palming of the item using the entire hand. As an example, when the application content item is outside of the container, gesture detector 324 may identify, from image data captured by image capture devices 138 or external cameras, one of the digits of the user or the palm of the user at a location in the physical environment that corresponds to a location of the application content item in the artificial reality content. In response to making this identification, including determining that the gesture is held for a particular amount of time, application engine 320 may execute an application function associated with the application content item and the execution gesture.

Once rendering engine 322 renders the first application content item in the second location, gesture detector 324 may identify, from the image data captured by image capture devices 138, a second selection gesture. Similar to the original selection gesture, the second selection gesture may be a configuration of the hand being substantially stationary for at least the threshold period of time at the second location corresponding to the first application content item and positioned to select the first application content item. Gesture detector 324 may also detect a second subsequent movement of the hand from the second location to a third location inside of the first container. In response to the second selection gesture and the second subsequent movement, rendering engine 322 may render the first application content item within the first container at the third location. In other words, the first application content item is not restricted from returning to the first container. After rendering the first application content item outside of the first container, rendering engine 322 may render the first application content item back inside the first container in response to such a second selection gesture and second subsequent movement.

In some examples, the application content item may be dragged around artificial reality content 122, but once the selection gesture is released, the resulting end location may be at a location back within the original container. In other words, while gesture detector 324 is detecting the subsequent movement of the first application content item through the artificial reality content, the subsequent movement may also lead the first application content item back to another location within the first container. If gesture detector 324 detects the selection gesture being released within the first container, the rendering engine 322 may render the first application content item within the first container rather than rendering the first application content item outside of the first container.

In other instances, once rendering engine 322 renders the first application content item in the second location, gesture detector 324 may identify, from the image data captured by image capture devices 138, a second selection gesture. Similar to the original selection gesture, the second selection gesture may be a configuration of the hand being substantially stationary for at least the threshold period of time at the second location corresponding to the first application content item and positioned to select the first application content item. Gesture detector 324 may also detect a second subsequent movement of the hand from the second location to a third location inside of a second container. In such instances, rendering engine 322 may render the first application content item within the second container at the third location in response to the second selection gesture and the second subsequent movement, as described above.

Figure 4:
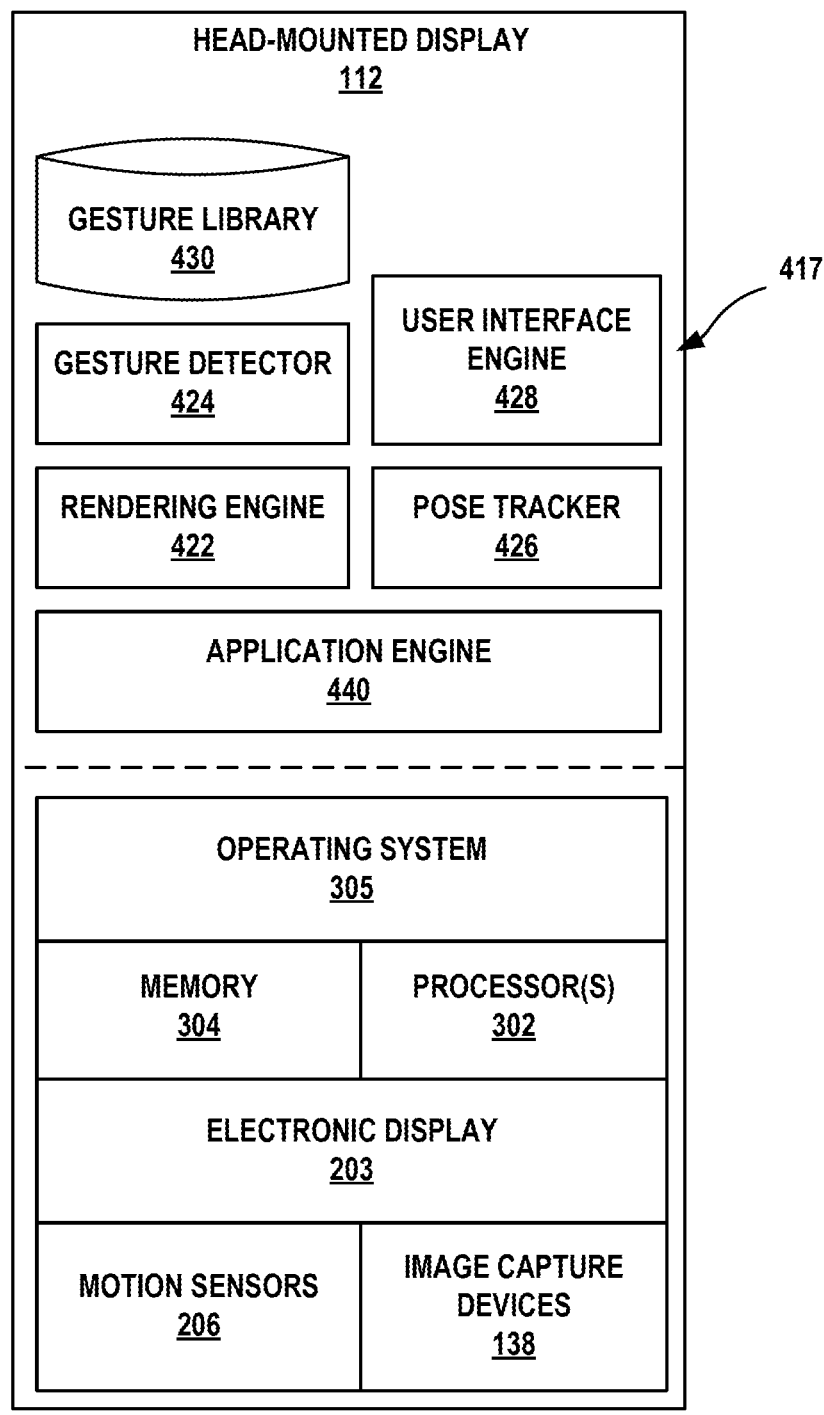
FIG. 4 is a block diagram depicting an example in which gesture detection and user interface generation is performed by the HMD of the artificial reality systems of FIGS. 1A, 1B in accordance with the techniques of the disclosure.

FIG. 4 is a block diagram depicting an example in which gesture detection and user interface generation is performed by HMD 112 of the artificial reality systems of FIGS. 1A, 1B in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct user interface elements overlaid on, or as part of, the artificial content for display to user 110 in accordance with detected gestures of user 110. In some examples, rendering engine 422 constructs the 3D, artificial reality content which may be overlaid, at least in part, upon the real-world, physical environment of user 110.

Similar to the examples described with respect to FIG. 3, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. In accordance with the techniques of the disclosure, user interface engine 428 generates user interface elements as part of, e.g., overlaid upon, the artificial reality content to be displayed to user 110 and/or performs actions based on one or more gestures or combinations of gestures of user 110 detected by gesture detector 424. More specifically, gesture detector 424 analyzes objects recognized within image data captured by image capture devices 138 of HMD 112 and/or sensors 90 or external cameras 102 to identify a hand and/or arm of user 110, and track movements of the hand and/or arm relative to HMD 112 to identify gestures performed by user 110. Gesture detector 424 may track movement, including changes to position and orientation, of the hand, digits, and/or arm based on the captured image data, and compare motion vectors of the objects to one or more entries in gesture library 430 to detect a gesture or combination of gestures performed by user 110.

Gesture library 430 is similar to gesture library 330 of FIG. 3. Each of the entries in gesture library 430 may specify, for the defined gesture or series of gestures, conditions that are required for the gesture to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

In response to detecting a matching gesture or combination of gestures, HMD 112 performs the response or action assigned to the matching entry in gesture library 430. For example, in accordance with the techniques of this disclosure, certain specialized gestures may be pre-defined such that, in response to gesture detector 424 detecting one of the pre-defined gestures, user interface engine 428 dynamically generates a user interface as an overlay to artificial reality content being displayed to the user, thereby allowing the user 110 to easily invoke a user interface for configuring HMD 112 while viewing artificial reality content. In other examples, in response to gesture detector 424 detecting one of the pre-defined gestures, user interface engine 428 and/or application engine 440 may receive input, select values or parameters associated with user interface elements, launch applications, modify configurable settings, send messages, start or stop processes or perform other actions.

In accordance with the techniques described herein, gesture detector 424 may detect gestures performed by a hand of a user and, based on the detected gestures, rendering engine 422 may shift application content items to another location within a container rendered as an overly to the artificial reality content, to a location outside of the container, or to another container within the artificial reality content. For instance, image capture devices 138, or external cameras, may be configured to capture image data representative of a physical environment. HMD 112 may output artificial reality content on electronic display 203. Rendering engine 422 may render a first container that includes one or more application content items as an overlay to the artificial reality content. In some instances, each of the one or more application content items are each associated with a same application. For instance, the first container may be associated with a media streaming application, and each of the one or more application content items may be different media streaming files which can be consumed via HMD 112.

In other instances, the one or more application content items may be associated with different applications. In other words, the first application content item of the one or more application content items may be associated with a first application and a second application item of the one or more application content items may be associated with a second application different than the first application. As an example, the first container may be a file folder, and each of the application content items may be files, such as text documents, media items, slideshow presentations, spreadsheet documents, database documents, or any other document that may be read by a computing device. Each of the application content items may be executable by different applications, but they may all be contained within the first container.

Gesture detector 424 may identify, from the image data, a selection gesture, where the selection gesture comprises a configuration of a hand that is substantially stationary for at least a threshold period of time at a first location corresponding to a first application content item of the one or more application content items within the first container and positioned to select the first application content item. Upon detecting the selection gestures, gesture detector 424 may also detect a subsequent movement of the hand from the first location to a second location outside of the first container. In some instances, the selection gesture may include a particular configuration of the hand predefined to represent selection of the first application content item, the configuration being the hand being positioned to grab the first application content item within the first container. This grabbing position could be, in some instances, a two-finger pinch of the thumb and a second digit of the hand with a point of contact between the two fingers being the first location. In other instances, the grabbing position may be a single-hand formation of a fist at the first location, or a two-handed clasping of the hands at the first location. Other examples of the grabbing position include a one- or two-handed shaping around a boundary of the first application content item such that gesture detector 424 detects the user's fingers or hands within a threshold proximity of two or more edges of the boundary of the first application content item, or any other configuration one would naturally make when grabbing an object. When gesture detector 424 detects a release of the grabbing position after the subsequent movement, gesture detector 424 may recognize that the movement is completed at the location of the release of the grabbing position, signaling rendering engine 422 to render the first application content item at the location of the release of the grabbing position. Gesture library 430 may include an entry defining the selection gesture, and gesture detector 424 may compare the image data to the entry in gesture library 430 to determine when a selection gesture has been performed.

In response to gesture detector 424 identifying the selection gesture and the subsequent movement, rendering engine 422 may render the first application content item at the second location. When rendering engine 422 renders the first application content item at the second location, in some instances, rendering engine 422 may further cease rendering the first application content item within the first container in response to the selection gesture and the subsequent movement. In other instances, rendering engine 422 may continue rendering the first application content item within the first container in addition to rendering the first application content item at the second location (e.g., when HMD 112 is copying the application content item to another location). In some instances, the second location may be simply within the artificial reality environment, outside of the construct of any particular container. In other instances, rendering engine 422 may render the first application content item within a second container at the second location in response to the identified selection gesture and subsequent movement.

For instance, the first container may be a private container output only on electronic display 203 and only visible to the user of HMD 112. Meanwhile, the second container may be a public container, visible to the user of HMD 112, while also displayed on other MID devices in communication with console 106, either locally or over a network. In this way, MID 112 and console 106 may easily share files or media streams with other HMDs or other consoles. For instance, consoles in separate geographical locations from console 106 may connect to console 106 over a network to render similar artificial reality content to both HMDs. By using the techniques described herein to move the application content item into a public container, both HMDs may watch a same media stream at the same time and in the same environment, simulating the users of the geographically separate HMDs being local with one another. Once this content is output on other HMDs or consoles, those HMDs or consoles may recognize similar selection gestures to copy the first application content item into a local folder for later access.

Gesture detector 422 identify an execution gesture that includes a configuration of the hand positioned to execute the first application item at the second location. Application engine 420 may then execute an application function associated with the first application content item in response to the execution gesture. Gesture library 430 may include an entry defining the execution gesture, and gesture detector 424 may compare the image data to the entry in gesture library 430 to determine when an execution gesture has been performed. For instance, when the first application content item is a media streaming item, the execution gesture may trigger application engine 420 to begin streaming the media streaming item. The execution gesture may be distinct from the selection gesture, such as a poke of the item using one or more digits of a hand or a palming of the item using the entire hand. As an example, when the application content item is outside of the container, gesture detector 424 may identify, from image data captured by image capture devices 138 or external cameras, one of the digits of the user or the palm of the user at a location in the physical environment that corresponds to a location of the application content item in the artificial reality content. In response to making this identification, including determining that the gesture is held for a particular amount of time, application engine 420 may execute an application function associated with the application content item and the execution gesture.

Once rendering engine 422 renders the first application content item in the second location, gesture detector 424 may identify, from the image data captured by image capture devices 138, a second selection gesture. Similar to the original selection gesture, the second selection gesture may be a configuration of the hand being substantially stationary for at least the threshold period of time at the second location corresponding to the first application content item and positioned to select the first application content item. Gesture detector 424 may also detect a second subsequent movement of the hand from the second location to a third location inside of the first container. In response to the second selection gesture and the second subsequent movement, rendering engine 422 may render the first application content item within the first container at the third location. In other words, the first application content item is not restricted from returning to the first container. After rendering the first application content item outside of the first container, rendering engine 422 may render the first application content item back inside the first container in response to such a second selection gesture and second subsequent movement.

In some examples, the application content item may be dragged around artificial reality content, but once the selection gesture is released, the resulting end location may be at a location back within the original container. In other words, while gesture detector 424 is detecting the subsequent movement of the first application content item through the artificial reality content, the subsequent movement may also lead the first application content item back to another location within the first container. If gesture detector 424 detects the selection gesture being released within the first container, the rendering engine 422 may render the first application content item within the first container rather than rendering the first application content item outside of the first container.

In other instances, once rendering engine 422 renders the first application content item in the second location, gesture detector 424 may identify, from the image data captured by image capture devices 138, a second selection gesture. Similar to the original selection gesture, the second selection gesture may be a configuration of the hand being substantially stationary for at least the threshold period of time at the second location corresponding to the first application content item and positioned to select the first application content item. Gesture detector 424 may also detect a second subsequent movement of the hand from the second location to a third location inside of a second container. In such instances, rendering engine 422 may render the first application content item within the second container at the third location in response to the second selection gesture and the second subsequent movement, as described above.

Figure 5A:
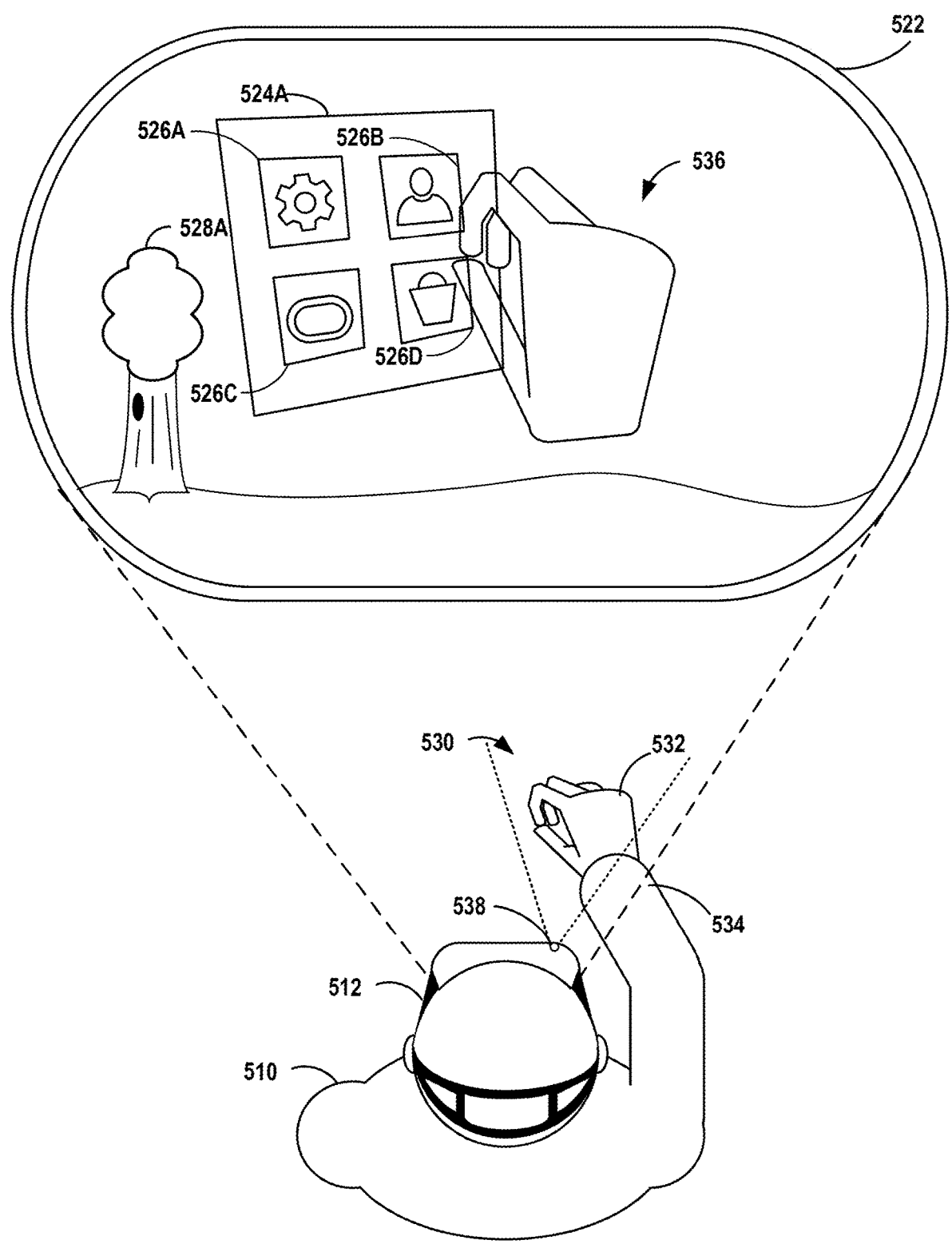
FIGS. 5A-5C are illustrations depicting an example artificial reality system that presents a container of application content items within an artificial reality environment and detects a selection gesture and subsequent movement of one of the application content items to a new location outside of the container, in accordance with the techniques of the disclosure.
Figure 5B:
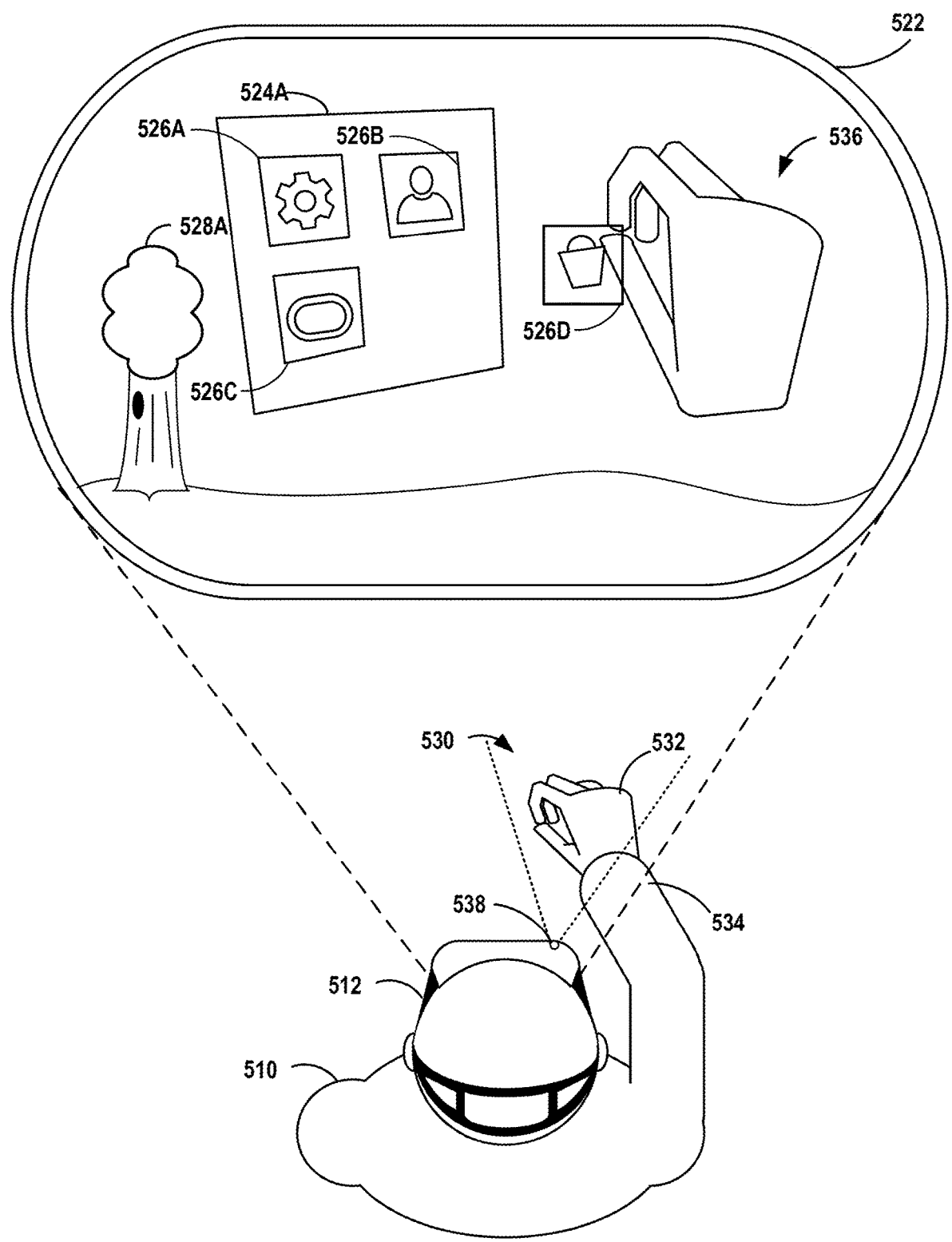
Figure 5C:
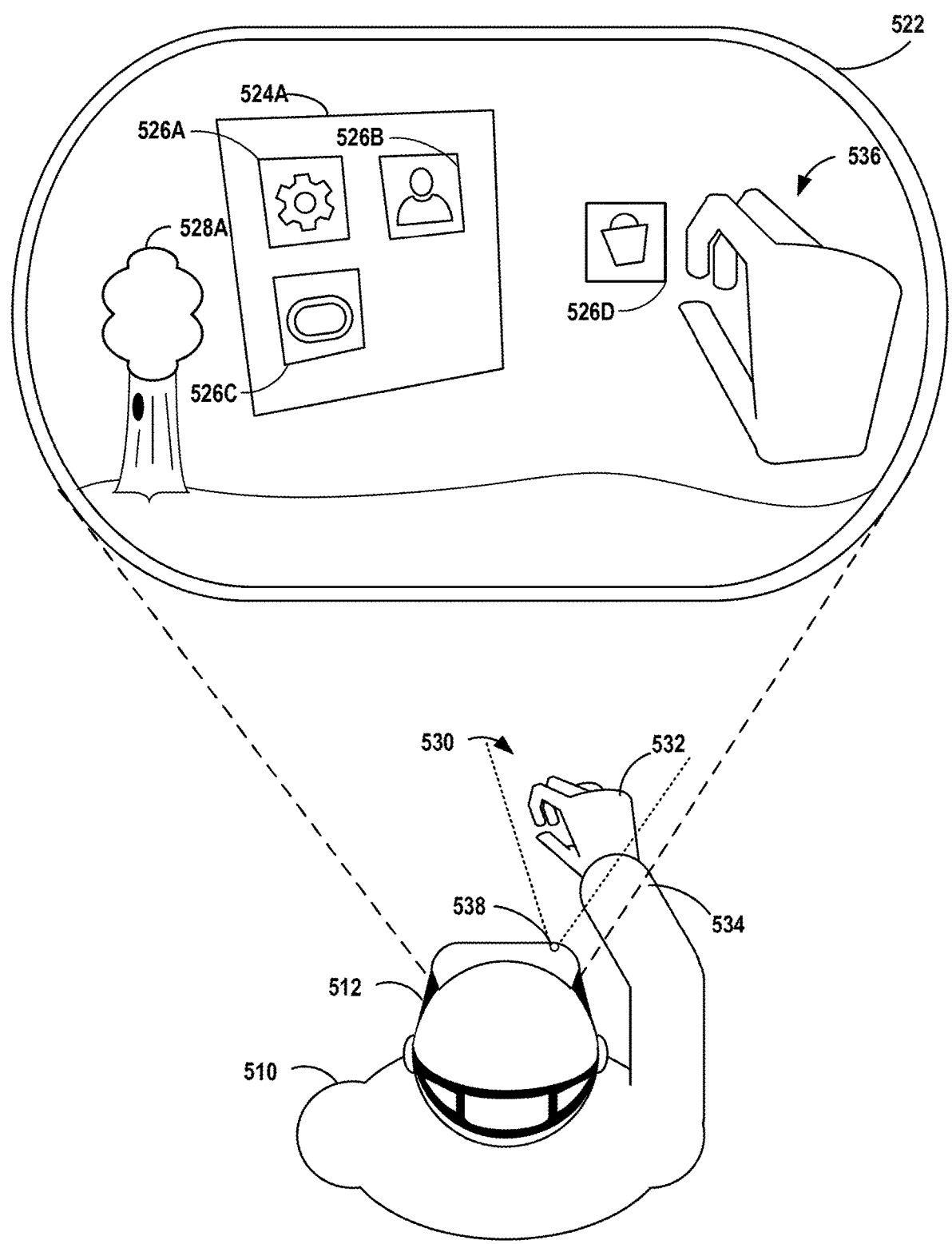

FIGS. 5A-5C are illustrations depicting an example artificial reality system that presents a first container of application content items within an artificial reality environment and detects a selection gesture and movement of one of the application content items to a new location outside of the container, in accordance with the techniques of the disclosure. HMD 512 of FIG. 5 may be an example of any of HMDs 112 of FIGS. 1A and 1B. HMD 512 may be part of an artificial reality system, such as artificial reality systems 10, 20 of FIGS. 1A, 1, or may operate as a stand-alone, mobile artificial realty system configured to implement the techniques described herein. While the below description describes HMD 512 performing various actions, a console connected to HMD 512, or particular engines within the console or HMD 512, may perform the various functions described herein. For instance, a rendering engine inside HMD 512 or a console connected to HMD 512 may perform the rendering operations, and a gesture detector inside HMD 512 or a console connected to HMD 512 may analyze image data to detect selection gestures in accordance with one or more of the techniques described herein.

In the example of FIG. 5A, image capture devices 538 may capture image data of the physical environment infield of view 530. This image data would include hand 532 of user 510. HMD 512 may render virtual hand 536 in a location within artificial reality content 522 based on a location of hand 532 within the physical environment. HMD 512 may also detect a configuration of t hand 532, rendering virtual hand 536 to have a similar configuration. HMD 512 may also render container 524A, which includes application content items 526A-526D.

In FIG. 5A, HMD 512 may identify, from the image data captured by image capture devices 538, a selection gesture that comprises hand 532 forming a grabbing configuration (e.g., by pinching the thumb and forefinger together). Furthermore, based on the location of hand 532 in field of view 530, HMD 512 may determine that the selection gesture is occurring at a location corresponding to a location of application content item 526D, and that the selection gesture has lasted for a threshold amount of time. As such, HMD 512 may determine that the selection gesture is intended to select application content item 526D.

In FIG. 5B, while HMD 512 detects that the selection gesture is still formed, HMD 512 may detect a subsequent movement of hand 532. HMD 512 may render this movement by rendering virtual hand 536 and application content item 526D moving along a path in artificial reality content 522 substantially similar to the path HMD 512 and image capture devices 538 detect hand 532 moving along in the physical environment. This results in HMD 512 rendering application content item 526D at a location outside of container 524A.

In FIG. 5C, HMD 512 detects that hand 532 had released the pinching configuration of the selection gesture, such as by separating the thumb and forefinger of the pinching configuration. HMD 512 may analyze the image data captured by image capture devices 538 to determine a particular location in the physical environment that hand 532 released the selection gesture, and map that particular release point to a corresponding location in artificial reality content 522. As such, HMD 512 may render application content item 526D at the location in artificial reality content 522 corresponding to the release point in the physical environment.

Figure 6A:
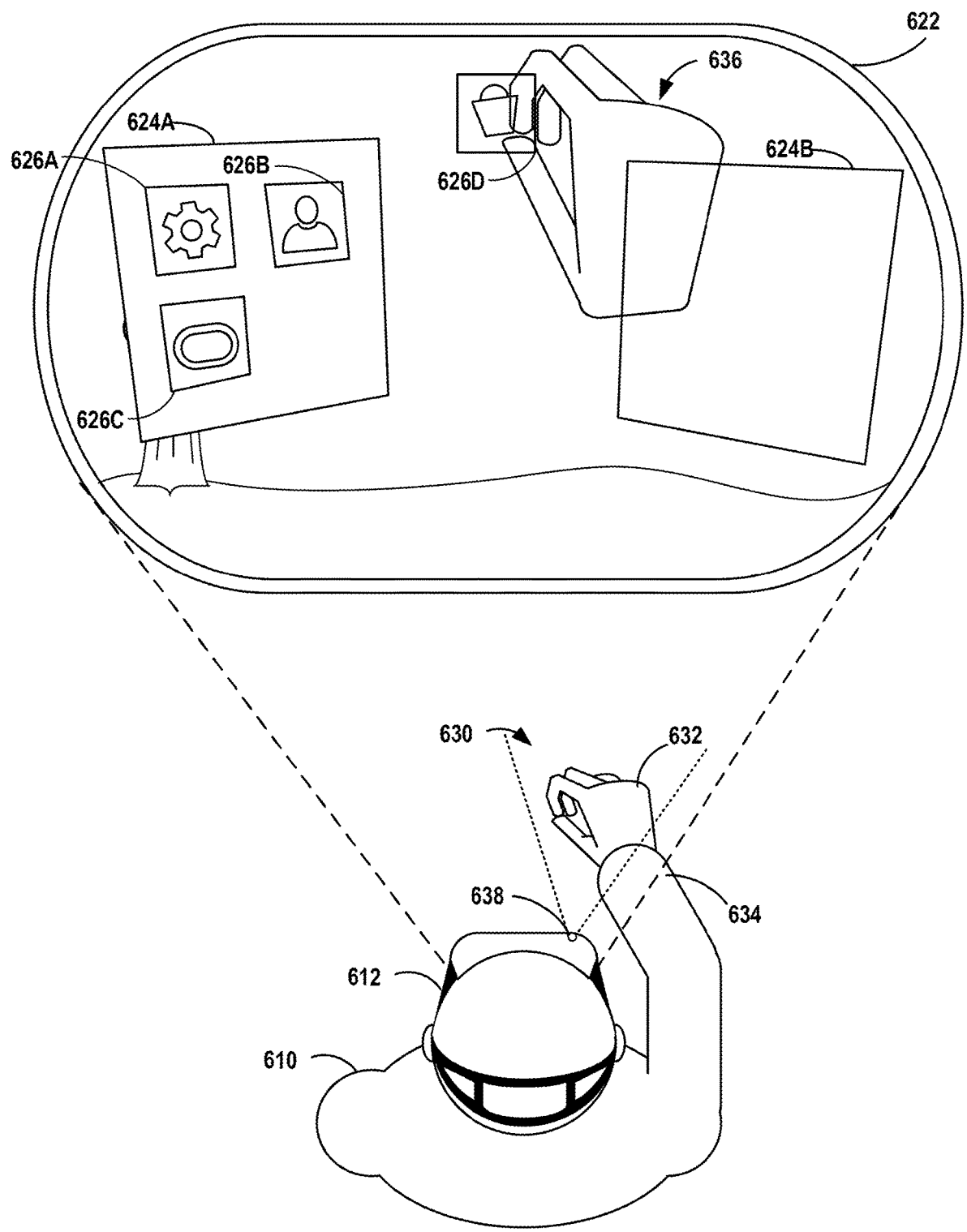
FIGS. 6A-6C are illustrations depicting an example artificial reality system that presents two containers of application content items within an artificial reality environment and detects a selection gesture and subsequent movement of an application content item from the artificial reality environment to a new location inside of the second container, in accordance with the techniques of the disclosure.
Figure 6B:
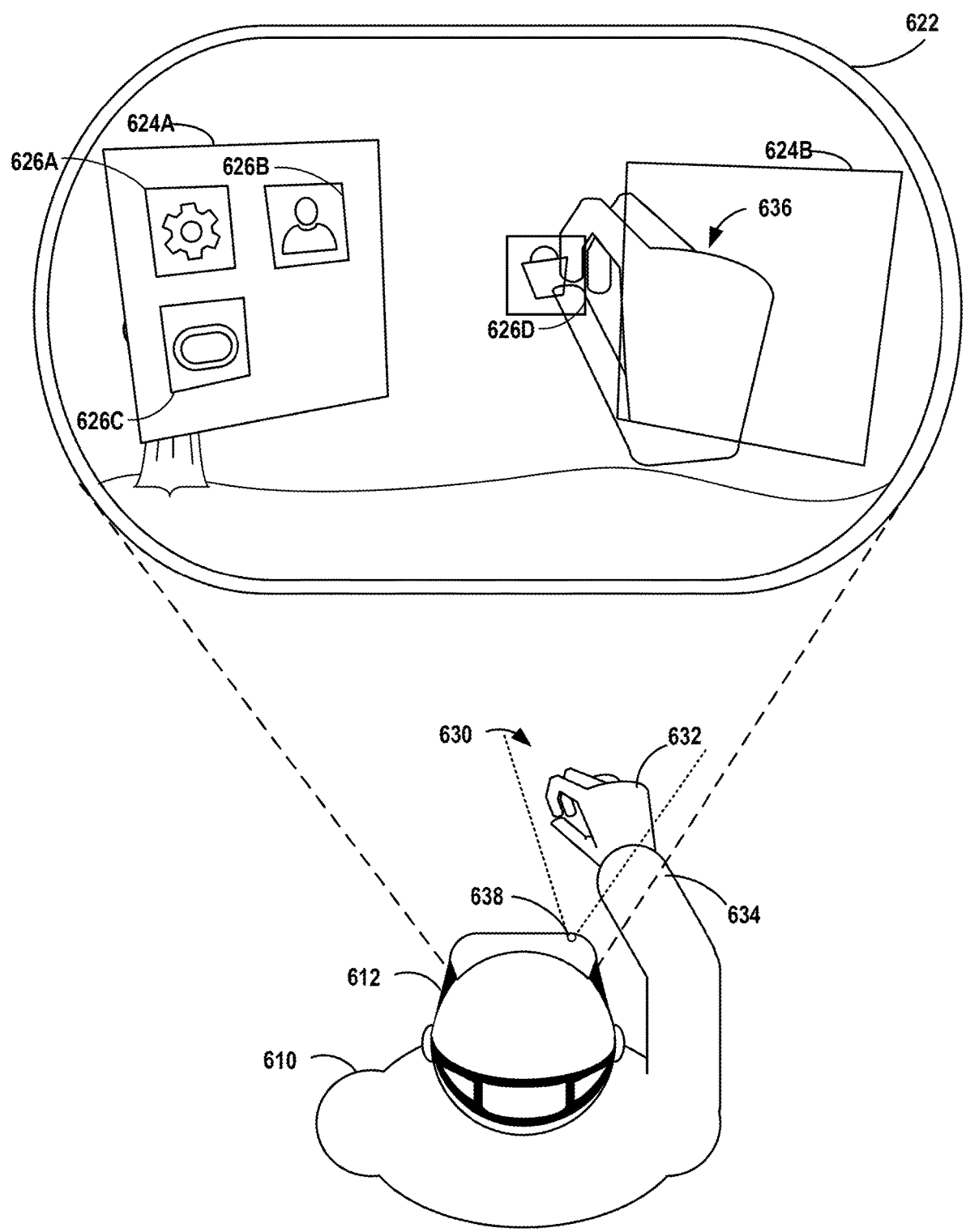
Figure 6C:
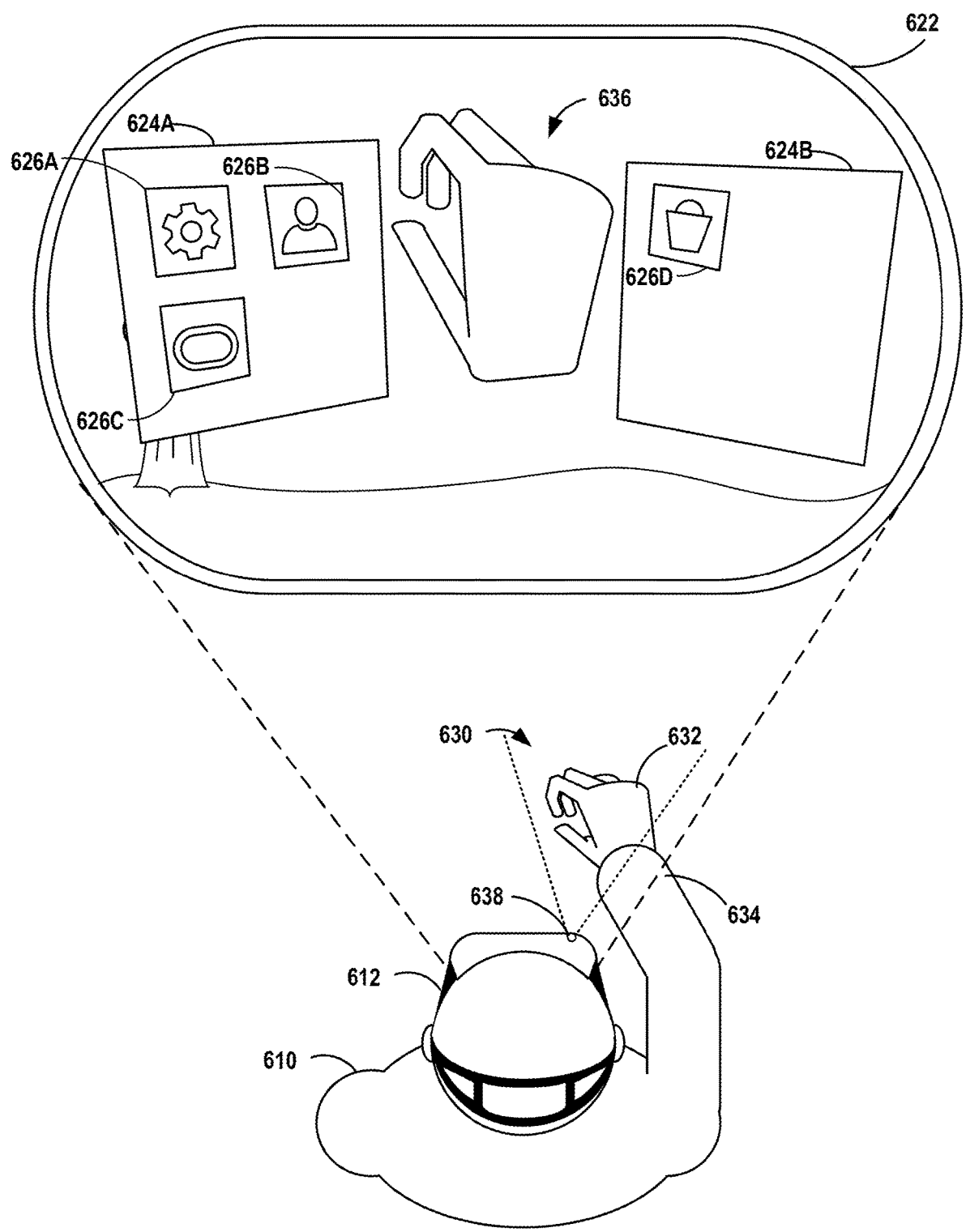

FIGS. 6A-6C are illustrations depicting an example artificial reality system that presents two containers of application content items within an artificial reality environment and detects a selection gesture and movement of an application content item from the artificial reality environment to a new location inside of a second container, in accordance with the techniques of the disclosure. HMD 612 of FIG. 6 may be an example of any of HMDs 112 of FIGS. 1A and 1B. HMD 612 may be part of an artificial reality system, such as artificial reality systems 10, 20 of FIGS. 1A, 1, or may operate as a stand-alone, mobile artificial realty system configured to implement the techniques described herein. While the below description describes HMD 612 performing various actions, a console connected to HMD 612, or particular engines within the console or HMD 612, may perform the various functions described herein. For instance, a rendering engine inside HMD 612 or a console connected to HMD 612 may perform the rendering operations, and a gesture detector inside HMD 612 or a console connected to HMD 612 may analyze image data to detect selection gestures in accordance with one or more of the techniques described herein.

In the particular sequence of FIGS. 6A-6C, container 624A may be a window representative of a first file folder that includes files represented by graphical user interface elements 626A-626C. Container 624A also may have been the original file location for the file represented by graphical user interface element 626D. Container 624B may be a window representative of a second file folder that is at a different file location than the first file folder represented by container 624A. Through the sequence of FIGS. 6A-6C, the file represented by graphical user interface element 626D may be cut-and-pasted into the second file folder represented by container 624B. In other examples, rather than cut, which indicates that the file would no longer be accessible through the first file folder represented by container 624A, the file represented by graphical user interface element 626D may be copied into the second file folder represented by 624B, and HMD 612 may continue rendering an indication of the file represented by graphical user interface element 626D in container 624A.

In the example of FIG. 6A, image capture devices 638 may capture image data of the physical environment in field of view 630. This image data would include hand 632 of user 610. HMD 612 may render virtual hand 636 in a location within artificial reality content 622 based on a location of hand 632 within the physical environment. HMD 612 may also detect a configuration of hand 632, rendering virtual hand 636 to have a similar configuration. HMD 612 may also render each of containers 624A and 624B. First container 624A includes application content items 626A-626C, and may be a private container visible only on HMD 612 and to user 610. Second container 624B may be a public container visible on HMD 612 and to user 610, as well as on other HMDs connected to HMD 612 locally or over a network. Second container 624B is shown as an empty container in FIG. 6A. HMD 612 may also render application content item 626D outside of both containers, existing in artificial reality content 622 outside of the container construct.

In FIG. 6A, HMD 612 may identify, from the image data captured by image capture devices 638, that hand 632 is making a selection gesture by forming a grabbing configuration (e.g., by pinching the thumb and forefinger together). Furthermore, based on the location of hand 632 in field of view 630, HMD 612 may determine that the selection gesture is occurring at a location corresponding to a location of application content item 626D, and that the selection gesture has lasted for a threshold amount of time. As such, HMD 612 may determine that the selection gesture is selecting application content item 626D.

In FIG. 6B, while HMD 612 detects that the selection gesture is still formed, HMD 612 may detect a subsequent movement of hand 632. HMD 612 may render this movement by rendering virtual hand 636 and application content item 626D moving along a path in artificial reality content 622 substantially similar to the path MID 612 and image capture devices 638 detect hand 632 moving along in the physical environment. This results in HMD 612 rendering application content item 626D at a location outside of, but proximate to, container 624B, as hand 632 moves towards the right.

In FIG. 6C, HMD 612 detects that hand 632 had released the pinching configuration of the selection gesture, such as by separating the thumb and forefinger of the pinching configuration. HMD 612 may analyze the image data captured by image capture devices 638 to determine a particular location in the physical environment that hand 632 released the selection gesture, and map that particular release point to a corresponding location in artificial reality content 622. As such, HMD 612 may render application content item 626D at the location in container 624B and artificial reality content 622 corresponding to the release point in the physical environment. HMD 612 may further detect hand 632 migrating back to a center position, and may render virtual hand 636 as such.

Figure 7A:
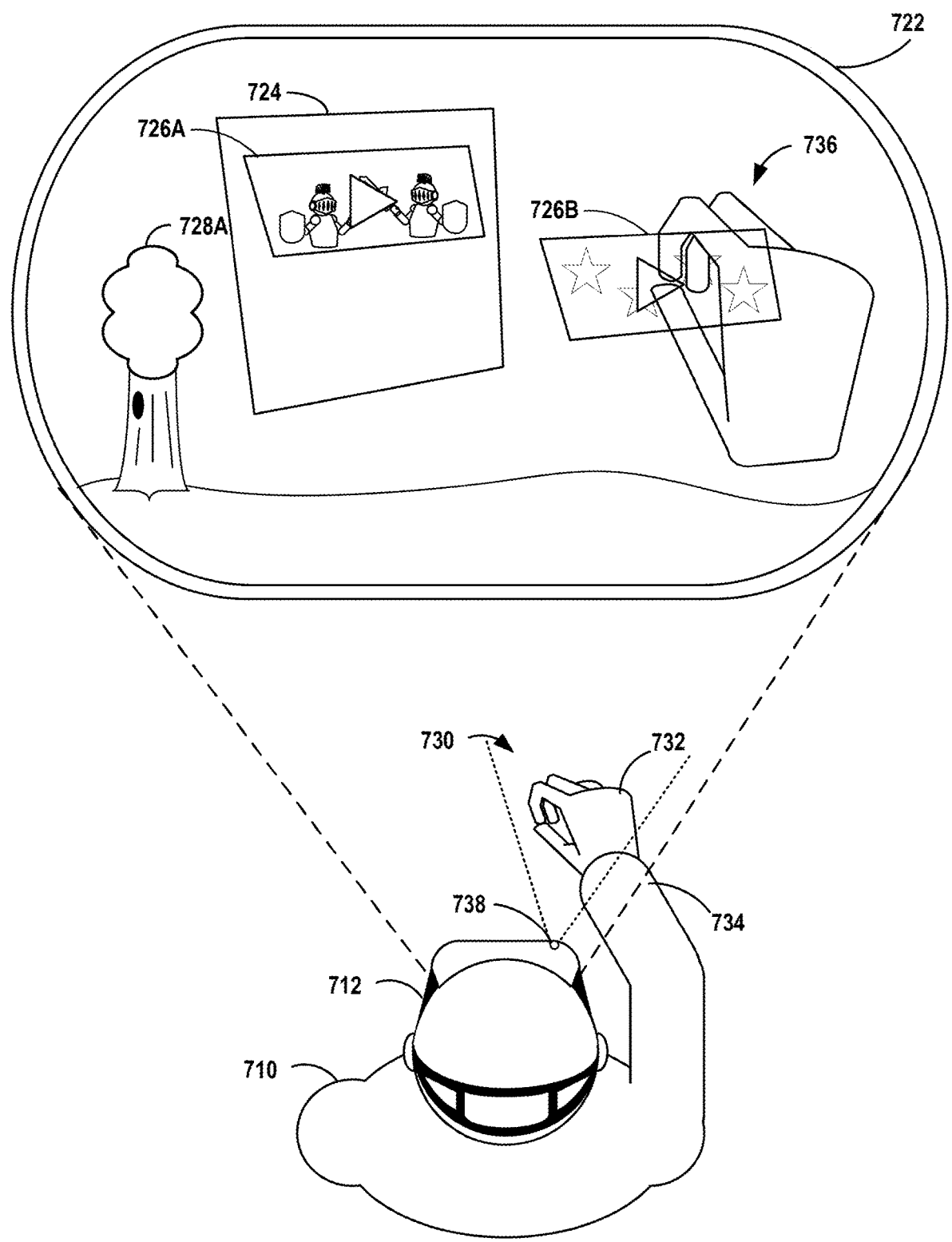
FIGS. 7A-7C are illustrations depicting an example artificial reality system that presents a container of application content items within an artificial reality environment and detects a selection gesture and subsequent movement of an application content item from the artificial reality environment to a new location inside of the container, in accordance with the techniques of the disclosure.
Figure 7B:
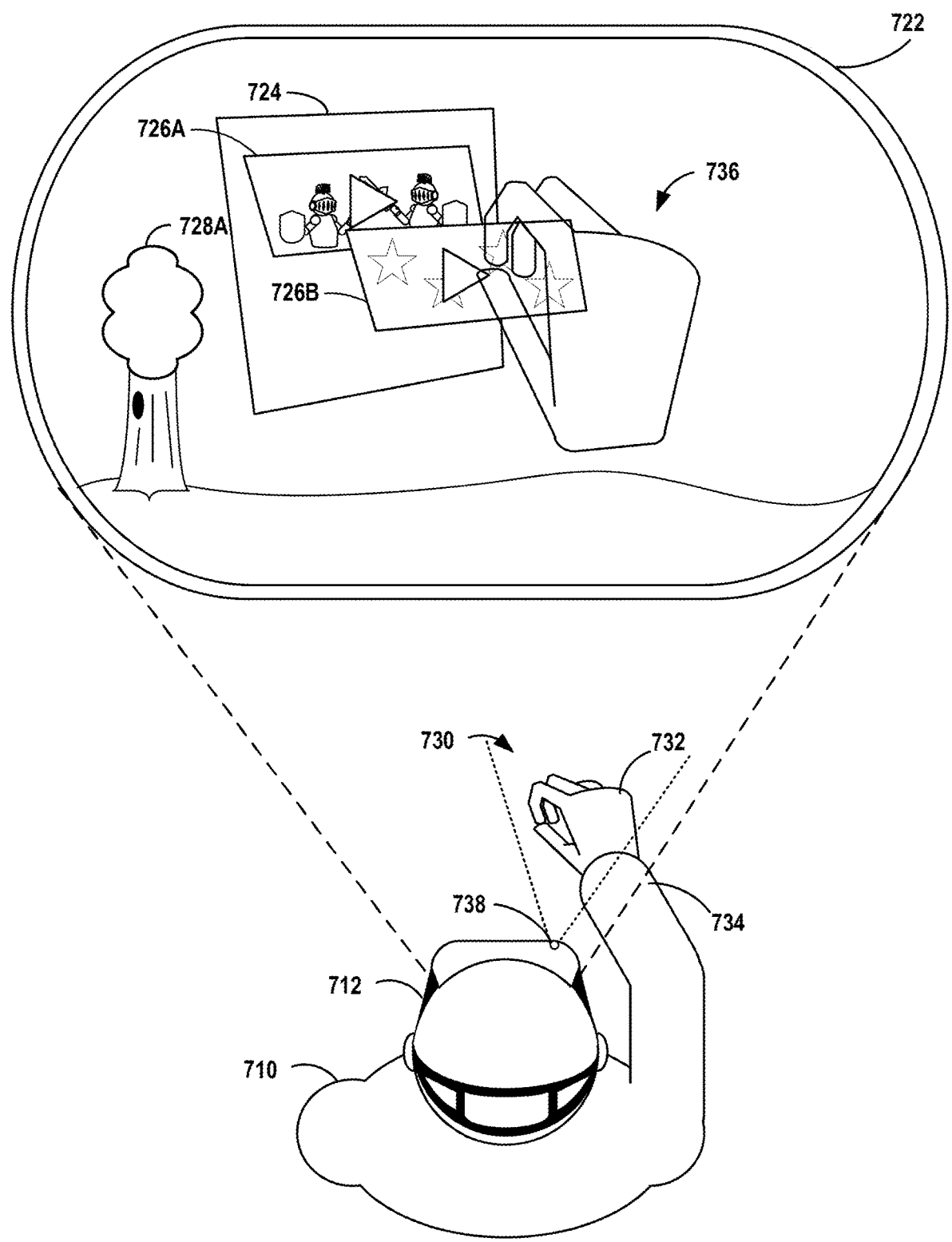
Figure 7C:
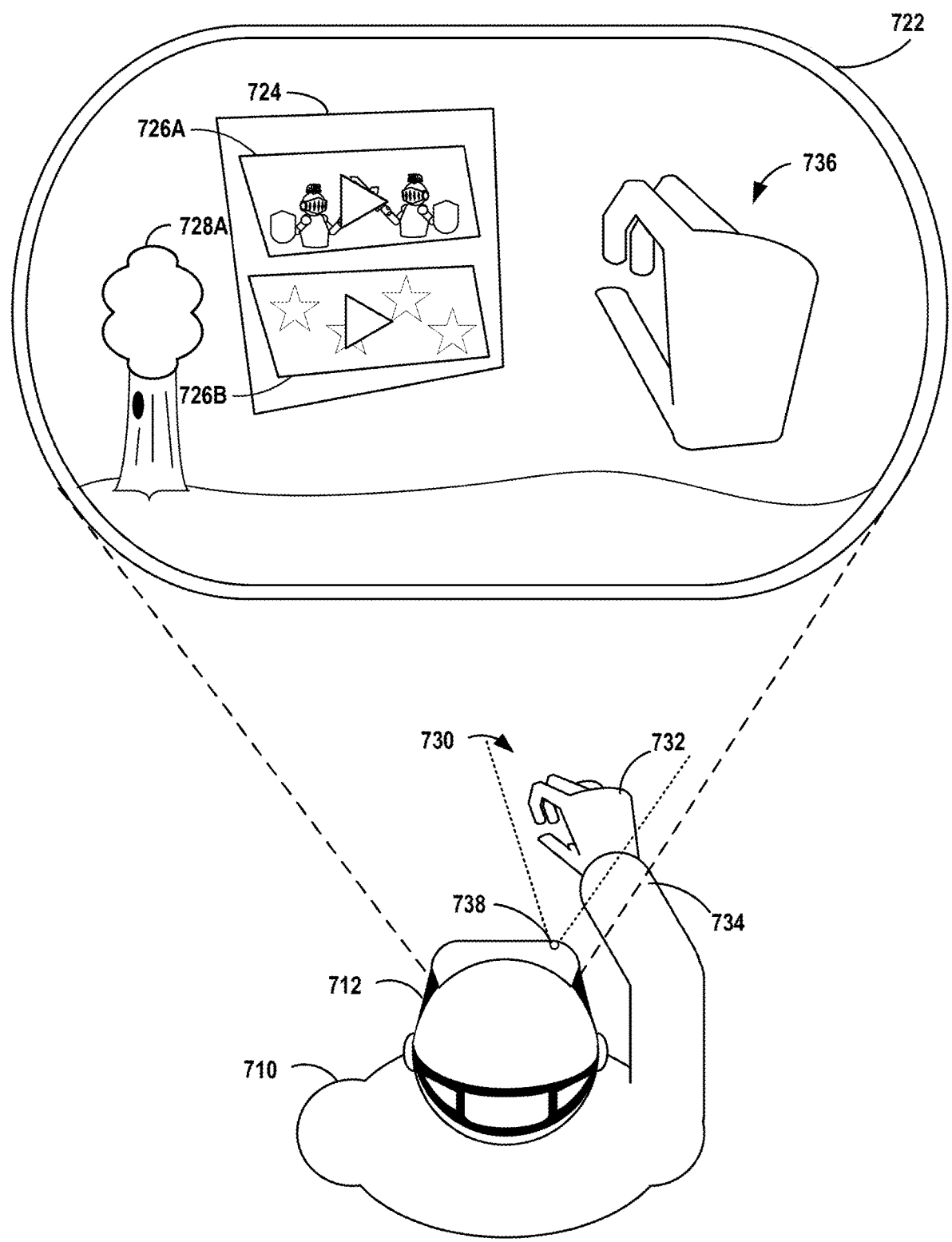

FIGS. 7A-7C are illustrations depicting an example artificial reality system that presents a first container of application content items within an artificial reality environment and detects a selection gesture and movement of an application content item from the artificial reality environment to a new location inside of the first container, in accordance with the techniques of the disclosure. HMD 712 of FIG. 7 may be an example of any of HMDs 112 of FIGS. 1A and 1B. HMD 712 may be part of an artificial reality system, such as artificial reality systems 10, 20 of FIGS. 1A, 1, or may operate as a stand-alone, mobile artificial realty system configured to implement the techniques described herein. While the below description describes HMD 712 performing various actions, a console connected to HMD 712, or particular engines within the console or HMD 712, may perform the various functions described herein. For instance, a rendering engine inside HMD 712 or a console connected to HMD 712 may perform the rendering operations, and a gesture detector inside HMD 712 or a console connected to HMD 712 may analyze image data to detect selection gestures in accordance with one or more of the techniques described herein.

In the particular sequence of FIGS. 7A-7C, container 724 may be an application window that originally includes various media streaming items associated with graphical user interface elements 726A-726B. In some instances, in order for any of media streaming items associated with graphical user interface elements 726A-726B to be streamed, the particular media streaming item must be selected and dragged to a location outside of container 724. Prior to the sequence of FIGS. 7A-7C, HMD 712 may have detected a selection gesture and subsequent movement of hand 732 to select graphical user interface element 726B, dragging graphical user interface element 726B to a location outside of container 724 within artificial reality content 722. HMD 712 may have streamed the media streaming item associated with graphical user interface element 726B, and in order to stop the streaming process or to cease rendering graphical user interface element 726B, HMD 712 may need to detect a subsequent selection gesture and a movement of hand 732 to place graphical user interface item 726B back into the original container 724.

In the example of FIG. 7A, image capture devices 738 may capture image data of the physical environment in field of view 730. This image data would include hand 732 of user 710. HMD 712 may render virtual hand 736 in a location within artificial reality content 722 based on a location of hand 732 within the physical environment. HMD 712 may also detect a configuration of the hand, rendering virtual hand 736 to have a similar configuration. HMD 712 may also render container 724. Container 724 includes application content item 726A. HMD 712 may also render application content item 726B outside of container 724, existing in artificial reality content 722 outside of the container construct.

In FIG. 7A, HMD 712 may identify, from the image data captured by image capture devices 738, that hand 732 is making a selection gesture by forming a grabbing configuration (e.g., by pinching the thumb and forefinger together). Furthermore, based on the location of hand 732 in field of view 730, HMD 712 may determine that the selection gesture is occurring at a location corresponding to a location of application content item 726B, and that the selection gesture has lasted for a threshold amount of time. As such, HMD 712 may determine that the selection gesture is selecting application content item 726B.

In FIG. 7B, while HMD 712 detects that the selection gesture is still formed, HMD 712 may detect a subsequent movement of hand 732. HMD 712 may render this movement by rendering virtual hand 736 and application content item 726B moving along a path in artificial reality content 722 substantially similar to the path HMD 712 and image capture devices 738 detect hand 732 moving along in the physical environment. This results in HMD 712 rendering virtual hand 736 and application content item 726B at a location inside of, or proximate to, container 724, as hand 732 moves towards the left.

In FIG. 7C, HMD 712 detects that hand 732 had released the pinching configuration of the selection gesture, such as by separating the thumb and forefinger of the pinching configuration. HMD 712 may analyze the image data captured by image capture devices 738 to determine a particular location in the physical environment that hand 732 released the selection gesture, and map that particular release point to a corresponding location in artificial reality content 722. As such, HMD 712 may render application content item 726D at the location in container 724 corresponding to the release point in the physical environment. HMD 712 may further detect hand 732 migrating back to a position further to the right of container 724 after releasing application content item 726B, and may render virtual hand 736 as such.

Figure 8A:
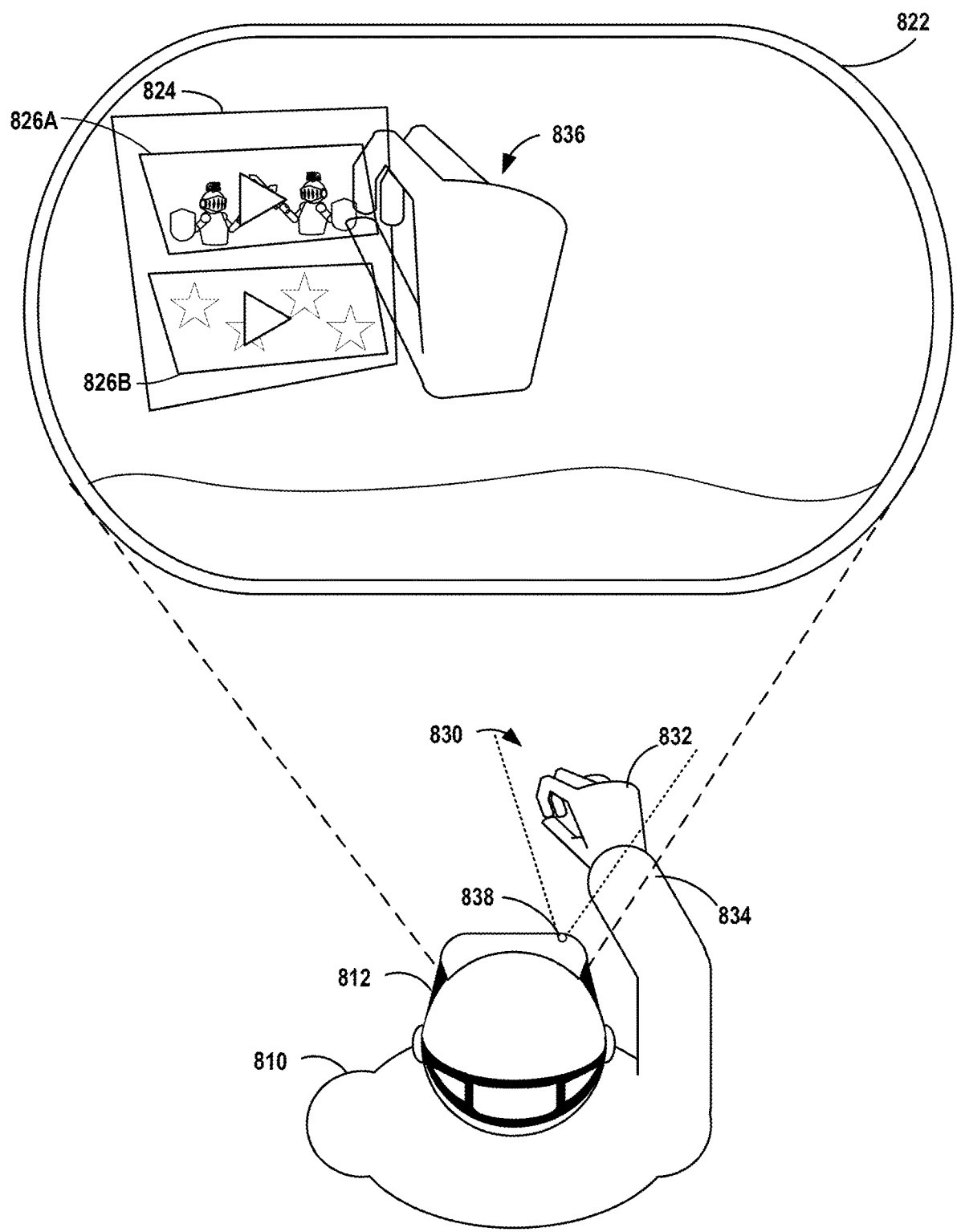
FIGS. 8A-8C are illustrations depicting an example artificial reality system that presents a container of application content items within an artificial reality environment and detects a selection gesture and subsequent movement of one of the application content items to a new location outside of the container, in accordance with the techniques of the disclosure.
Figure 8B:
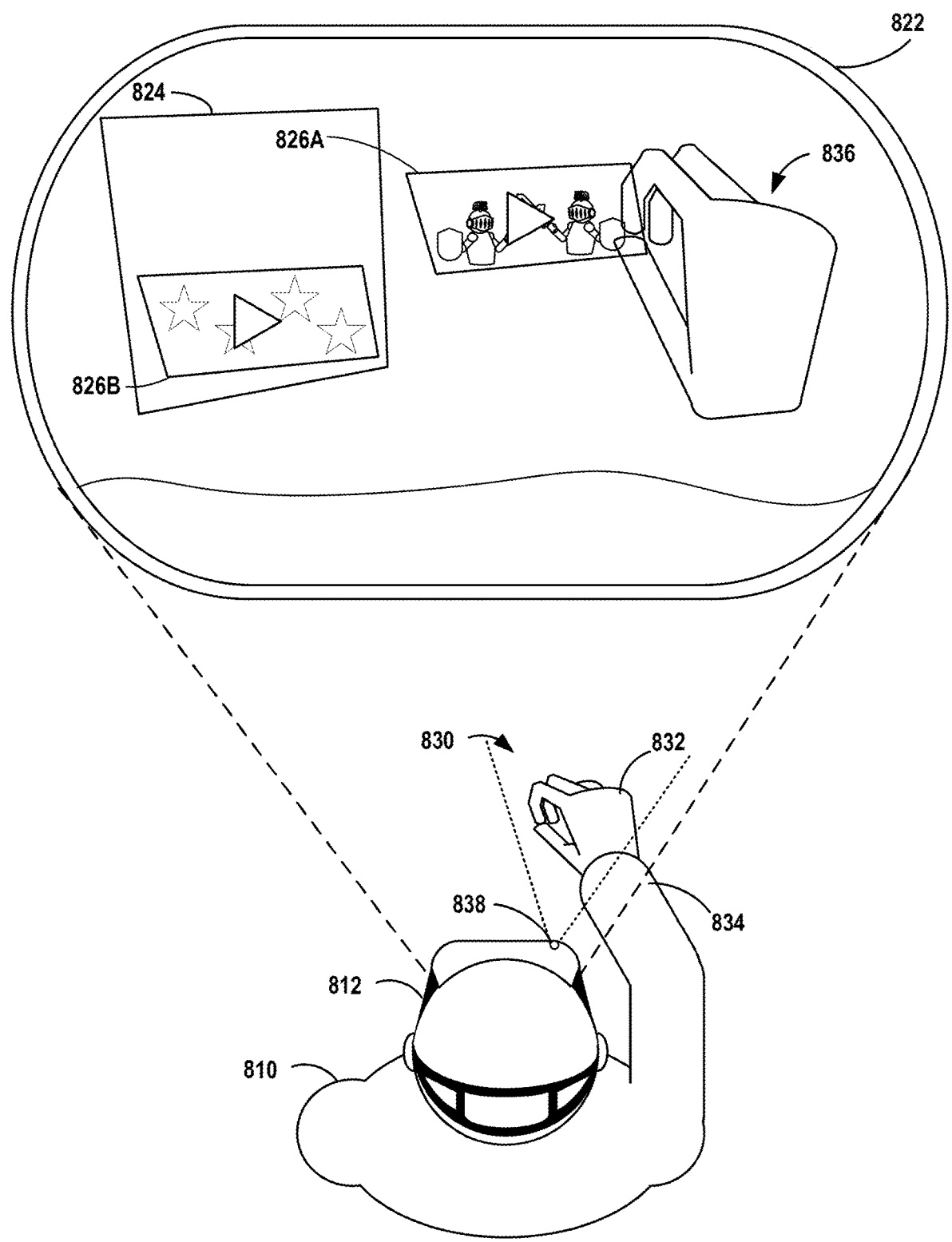
Figure 8C:
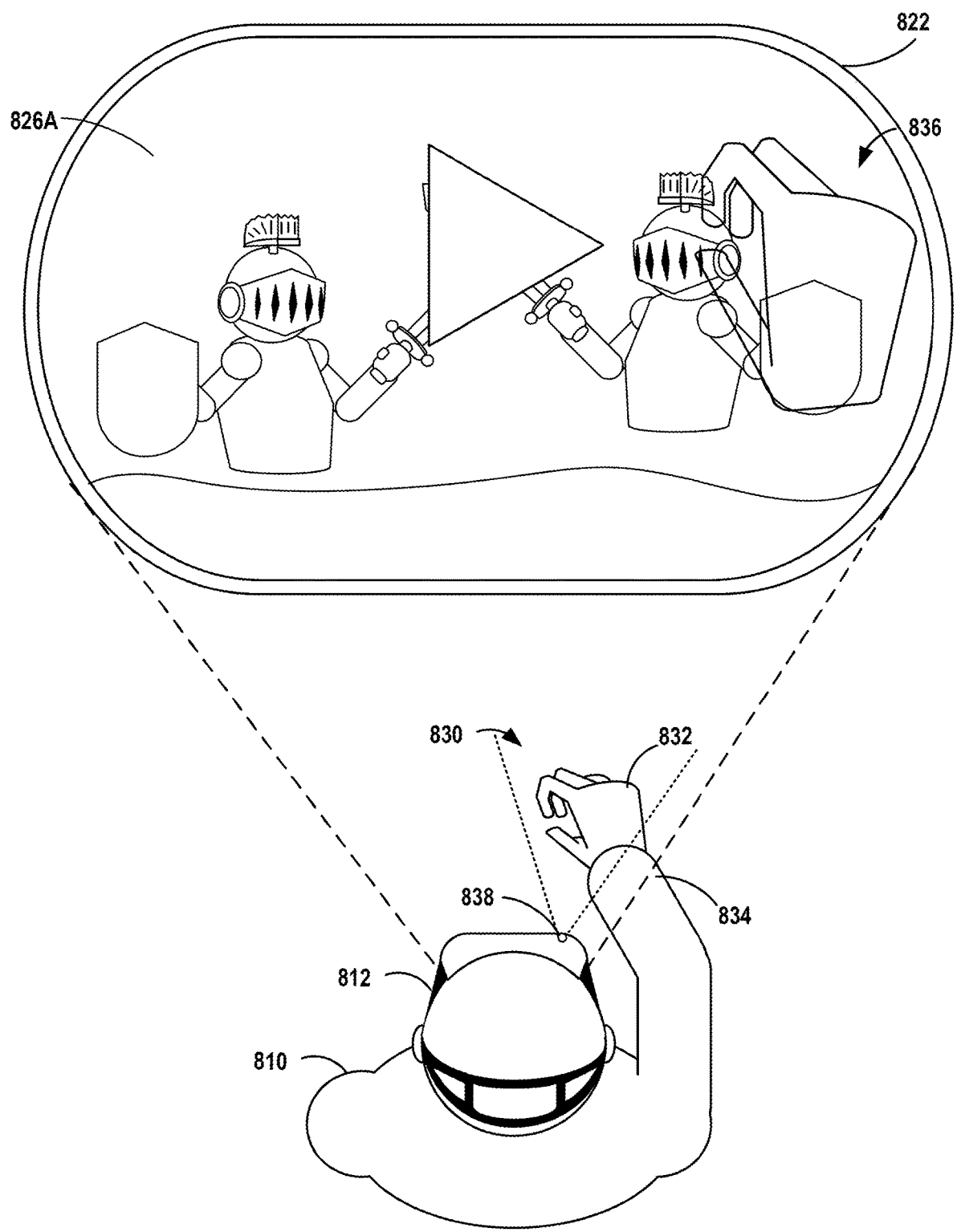

FIGS. 8A-8C are illustrations depicting an example artificial reality system that presents a first container of application content items within an artificial reality environment and detects a selection gesture and movement of one of the application content items to a new location outside of the container, in accordance with the techniques of the disclosure. HMD 812 of FIG. 8 may be an example of any of HMDs 112 of FIGS. 1A and 1B. HMD 812 may be part of an artificial reality system, such as artificial reality systems 10, 20 of FIGS. 1A, 1, or may operate as a stand-alone, mobile artificial realty system configured to implement the techniques described herein. While the below description describes HMD 812 performing various actions, a console connected to HMD 812, or particular engines within the console or HMD 812, may perform the various functions described herein. For instance, a rendering engine inside HMD 812 or a console connected to HMD 812 may perform the rendering operations, and a gesture detector inside HMD 812 or a console connected to HMD 812 may analyze image data to detect selection gestures in accordance with one or more of the techniques described herein.

In the example of FIG. 8A, image capture devices 838 may capture image data of the physical environment infield of view 830. This image data would include hand 832 of user 810. HMD 812 may render virtual hand 836 in a location within artificial reality content 822 based on a location of hand 832 within the physical environment. HMD 812 may also detect a configuration of hand 832, rendering virtual hand 836 to have a similar configuration. HMD 812 may also render container 824A, which includes media streaming items 826A and 826B.

In FIG. 8A, HMD 812 may identify, from the image data captured by image capture devices 838, that hand 832 is making a selection gesture by forming a grabbing configuration (e.g., by pinching the thumb and forefinger together). Furthermore, based on the location of hand 832 in field of view 830, HMD 812 may determine that the selection gesture is occurring at a location corresponding to a location of media streaming item 826A, and that the selection gesture has lasted for a threshold amount of time. As such, HMD 812 may determine that the selection gesture is selecting media streaming item 826A.

In FIG. 8B, while HMD 812 detects that the selection gesture is still formed, HMD 812 may detect a subsequent movement of hand 832. HMD 812 may render this movement by rendering virtual hand 836 and media streaming item 826A moving along a path in artificial reality content 822 substantially similar to the path HMD 812 and image capture devices 838 detect hand 832 moving along in the physical environment. This results in HMD 812 rendering media streaming item 826A at a location outside of container 824A.

In FIG. 8C, HMD 812 detects that hand 832 had released the pinching configuration of the selection gesture, such as by separating the thumb and forefinger of the pinching configuration. HMD 812 may analyze the image data captured by image capture devices 838 to determine a particular location in the physical environment that hand 832 released the selection gesture, and map that particular release point to a corresponding location in artificial reality content 822. As such, HMD 812 may render media streaming item 826A at the location in artificial reality content 822 corresponding to the release point in the physical environment.

In the specific example of FIG. 8C, upon HMD 812 detecting that the selection gesture had been released and rendering media streaming item 826A outside of container 824A of FIGS. 8A and 8B, HMD 812 may render media streaming item 826A such that the background of artificial reality content 822 is replaced by a rendering of media streaming item 826A. In this way, artificial reality content 822 itself may act as the container, and media streaming item 826A may be enlarged for the purposes of better viewing media streaming item 826A. In some instances, upon detecting the release of the selection gesture, HMD 812 may begin executing media streaming item 826A by beginning to stream the content associated with media streaming item 826A. In other instances, HMD 812 may wait until an execution gesture is detected, such as a poke of media streaming item 826A or a palming of media streaming item 826A. This example could be implemented if user 810 wanted to wait for HMDs of other users to join, either locally or over a network, a viewing party for media streaming item 826A.

Figure 9:
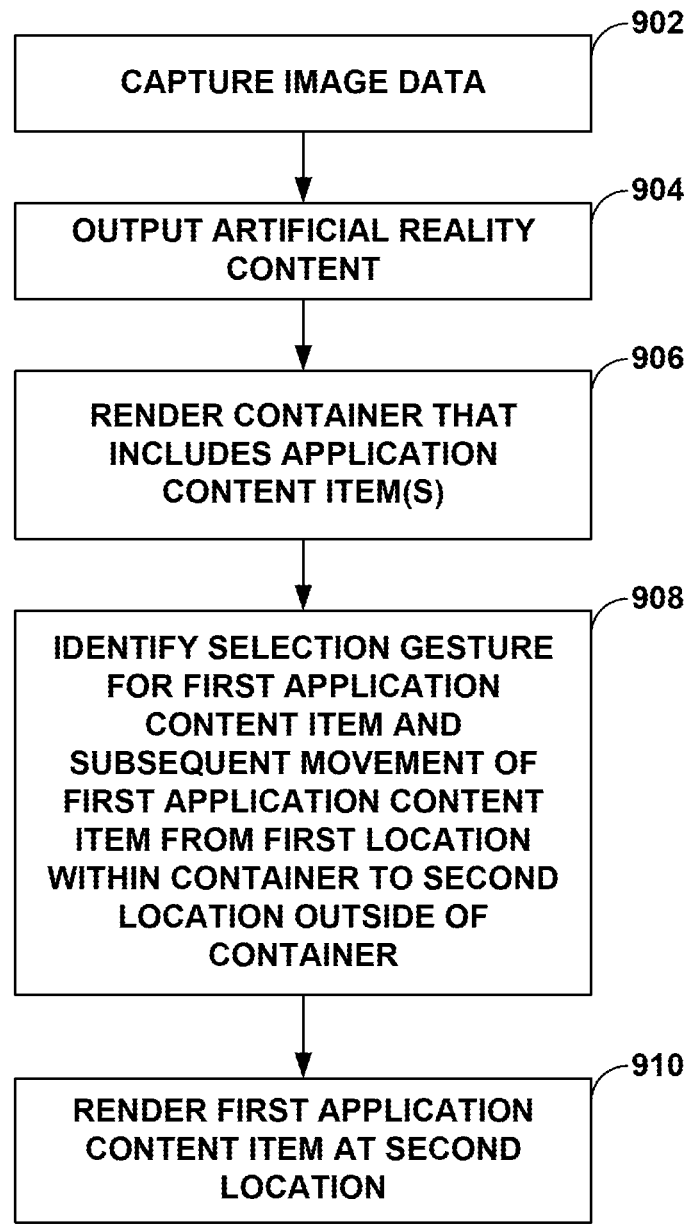
FIG. 9 is a flow diagram illustrating an example technique for an artificial reality system configured to render a container containing application content items and to detect a gesture that causes the artificial reality system to render one of the application content items outside of the container, in accordance with the techniques of the disclosure.

FIG. 9 is a flow diagram illustrating an example technique for an artificial reality system configured to render a container containing application content items and to detect a gesture that causes the artificial reality system to render one of the application content items outside of the container, in accordance with the techniques of the disclosure. The example operation may be performed by HMD 112, either alone or in conjunction with console 106, from FIGS. 1A and 1B. The following are steps of the process, although other examples of the process performed in accordance with the techniques of this disclosure may include additional steps or may not include some of the below-listed steps.

In accordance with the techniques described herein, HMD 112 (or an image capture device, such as image capture devices 138 or external cameras) may capture image data representative of a physical environment (902). HMD 112 may output artificial reality content (904). A rendering engine of HMD 112 or console 106 (e.g., rendering engine 322 or 422 of FIG. 3 or 4, respectively) may render a first container that includes one or more application content items as an overlay to the artificial reality content (906). A gesture detector of HMD 112 or console 106 (e.g., gesture detector 324 or 424 of FIG. 3 or 4, respectively) may identify, from the image data, a selection gesture performed by a hand of a user (908). The selection gesture comprising a configuration of the hand being held substantially stationary for at least a threshold period of time at a first location corresponding to a first application content item within the container and positioned to select the first application content item, and a subsequent movement of the hand from the first location to a second location outside the container. The rendering engine of HMD 112 or console 106 may further render the first application content item at the second location in response to the selection gesture and the subsequent movement (910).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD- ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
    an image capture device configured to capture image data representative of a physical environment;
    a head-mounted display (HMD) configured to output artificial reality content, wherein the HMD is associated with a user of a plurality of users participating in an artificial reality environment;
    a rendering engine comprising processing circuitry configured to render a private container that includes one or more executable application content items as an overlay to the artificial reality content, wherein the private container is rendered only for the user at the HMD;
    a gesture detector comprising processing circuitry configured to identify, from the image data, a selection gesture comprising a pinching configuration of two fingers from a hand of the user that is substantially stationary for at least a threshold period of time at a first location corresponding to a first application content item of the one or more executable application content items within the private container and positioned to select the first application content item, a subsequent movement of the hand while in the pinching configuration from the first location to a second location outside the private container, and a release of the pinching configuration of the selection gesture at the second location,
    wherein the rendering engine is configured to render the first application content item at the second location in response to the release of the pinching configuration of the selection gesture at the second location, wherein the first application content item at the second location is rendered for each user of the plurality of users participating in the artificial reality environment at respective HMDs;
    wherein the gesture detector is further configured to identify, from the image data, an execution gesture comprising a configuration of a hand of any user of the plurality of users participating in the artificial reality environment positioned to execute the first application item at the second location; and
    an application engine comprising processing circuitry configured to execute an application function associated with the first application content item at the second location in response to the execution gesture.

2. The artificial reality system of claim 1, wherein the rendering engine is configured to render a public container as an overlay to the artificial reality content, wherein the public container is rendered for each user of the plurality of users participating in the artificial reality environment at the respective HMDs, and wherein the first application content item is rendered within the public container at the second location in response to the identified selection gesture.

3. The artificial reality system of claim 1, wherein the rendering engine is configured to, upon execution of the first application content item at the first location within the private container, render the content of the first application content item only for the user at the HMD.

4. The artificial reality system of claim 1, wherein the one or more executable application content items are each associated with a same application.

5. The artificial reality system of claim 1, wherein the first application content item of the one or more executable application content items is associated with a first application of one or more applications and a second application content item of the one or more executable application content items is associated with a second application of the one or more applications that is different than the first application.

6. The artificial reality system of claim 1, wherein the selection gesture comprises a first selection gesture,
    wherein the gesture detector is further configured to identify, from the image data, a second selection gesture comprising a pinching configuration of the two fingers from the hand of the user being substantially stationary for at least the threshold period of time at the second location corresponding to the first application content item and positioned to select the first application content item, a subsequent movement of the hand while in the pinching configuration from the second location to a third location inside of the private container, and a release of the pinching configuration of the second selection gesture at the third location inside of the private container, and
    wherein the rendering engine is further configured to render the first application content item within the private container at the third location in response to the release of the pinching configuration of the second selection gesture at the third location, wherein the first application content item at the third location inside of the private container is rendered only for the user at the HMD.

7. The artificial reality system of claim 1, wherein the hand of the user comprises a first hand of a first user of the plurality of users participating in the artificial reality environment, wherein the selection gesture comprises a first selection gesture,
    wherein the gesture detector is further configured to identify, from the image data, a second selection gesture comprising a pinching configuration of two fingers from a second hand of a second user of the plurality of users participating in the artificial reality environment being substantially stationary for at least the threshold period of time at the second location corresponding to the first application content item and positioned to select the first application content item, a subsequent movement of the second hand while in the pinching configuration from the second location to a third location inside of a second container, and a release of the pinching configuration of the second selection gesture at the third location inside of the second container, wherein the second container is rendered only for the second user at a respective UND associated with the second user, and wherein the rendering engine is further configured to render the first application content item within the second container at the third location in response to the release of the pinching configuration of the second selection gesture at the third location, wherein the first application content item at the third location inside of the second container is rendered only for the second user at the respective HMD.

8. The artificial reality system of claim 1, wherein the rendering engine is further configured to cease rendering the first application content item within the private container in response to the release of the pinching configuration of the selection gesture at the second location.

9. The artificial reality system of claim 1, wherein the rendering engine is further configured to continue rendering the first application content item within the private container in addition to rendering the first application content item at the second location in response to the release of the pinching configuration of the selection gesture at the second location.

10. The artificial reality system of claim 1, wherein the rendering engine is further configured to, upon execution of the first application content item at the second location, render content of the first application content item for each user of the plurality of users participating in the artificial reality environment at the respective HMDs.

11. The artificial reality system of claim 1, wherein the image capture device is integrated within the HMD.

12. A method comprising:
capturing, by an image capture device of an artificial reality system, image data representative of a physical environment;
outputting, by a head mounted display (HMD) of the artificial reality system, artificial reality content, wherein the HMD is associated with a user of a plurality of users participating in an artificial reality environment;
rendering a private container that includes one or more executable application content items as an overlay to the artificial reality content, wherein the private container is rendered only for the user at the HMD;
identifying, from the image data, a selection gesture comprising a pinching configuration of two fingers from a hand of the user that is substantially stationary for at least a threshold period of time at a first location corresponding to a first application content item of the one or more executable application content items within the private container and positioned to select the first application content item, a subsequent movement of the hand while in the pinching configuration from the first location to a second location outside the private container, and a release of the pinching configuration of the selection gesture at the second location;
rendering the first application content item at the second location in response to the release of the pinching configuration of the selection gesture at the second location, wherein the first application content item at the second location is rendered for each user of the plurality of users participating in the artificial reality environment at respective HMDs;
identifying, from the image data, an execution gesture comprising a configuration of a hand of any user of the plurality of users participating in the artificial reality environment positioned to execute the first application item at the second location; and
executing an application function associated with the first application content item at the second location in response to the execution gesture.

13. The method of claim 12, the method further comprising rendering a public container as an overlay to the artificial reality content, wherein the public container is rendered for each user of the plurality of users participating in the artificial reality environment at the respective HMDs,
wherein rendering the first application content item at the second location comprises rendering the first application content item within the public container at the second location in response to the identified selection gesture.

14. The method of claim 12, wherein the one or more executable application content items are each associated with a same application.

15. The method of claim 12, wherein the first application content item of the one or more executable application content items is associated with a first application of one or more applications and a second application content item of the one or more executable application content items is associated with a second application of the one or more applications that is different than the first application.

16. The method of claim 12, wherein the selection gesture comprises a first selection gesture, and wherein the method further comprises:
identifying, from the image data, a second selection gesture comprising a pinching configuration of the two fingers from the hand of the user being substantially stationary for at least the threshold period of time at the second location corresponding to the first application content item and positioned to select the first application content item, a subsequent movement of the hand while in the pinching configuration from the second location to a third location inside of the private container, and a release of the pinching configuration of the second selection gesture at the third location inside of the private container; and
rendering the first application content item within the private container at the third location in response to the release of the pinching configuration of the second selection gesture at the third location, wherein the first application content item at the third location inside of the private container is rendered only for the user at the HMD.

17. The method of claim 12, wherein the hand of the user comprises a first hand of a first user of the plurality of users participating in the artificial reality environment, wherein the selection gesture comprises a first selection gesture, and wherein the method further comprises:
identifying, from the image data, a second selection gesture comprising a pinching configuration of two fingers from a second hand of a second user of the plurality of users participating in the artificial reality environment being substantially stationary for at least the threshold period of time at the second location corresponding to the first application content item and positioned to select the first application content item, a subsequent movement of the second hand while in the pinching configuration from the second location to a third location inside of a second container, and a release of the pinching configuration of the second selection gesture at the third location inside of the second container, wherein the second container is rendered only for the second user at a respective HMD associated with the second user; and rendering the first application content item within the second container at the third location in response to the release of the pinching configuration of the second selection gesture at the third location, wherein the first application content item at the third location inside of the second container is rendered only for the second user at the respective HMD.

18. The method of claim 12, further comprising, upon execution of the first application content item at the first location within the private container, rendering the content of the first application content item only for the user at the HMD.

19. The method of claim 12, further comprising, upon execution of the first application content item at the second location, rendering content of the first application content item for each user of the plurality of users participating in the artificial reality environment at the respective HMDs.

20. A non-transitory computer-readable medium comprising instructions that, when executed, cause one or more processors of an artificial reality system to:

capture image data representative of a physical environment;

output artificial reality content at a head-mounted display (HMD), wherein the HMD is associated with a user of a plurality of users participating in an artificial reality environment;

render a private container that includes one or more executable application content items as an overlay to the artificial reality content, wherein the private container is rendered only for the user at the HMD;

identify, from the image data, a selection gesture comprising a pinching configuration of two fingers from a hand of the user that is substantially stationary for at least a threshold period of time at a first location corresponding to a first application content item of the one or more executable application content items within the private container and positioned to select the first application content item, a subsequent movement of the hand while in the pinching configuration from the first location to a second location outside the private container, and a release of the pinching configuration of the selection gesture at the second location;

render the first application content item at the second location in response to the release of the pinching configuration of the selection gesture at the second location, wherein the first application content item at the second location is rendered for each user of the plurality of users participating in the artificial reality environment at respective HMDs;

to identify, from the image data, an execution gesture comprising a configuration of a hand of any user of the plurality of users participating in the artificial reality environment positioned to execute the first application item at the second location; and execute an application function associated with the first application content item at the second location in response to the execution gesture.

* * * * *